(12) United States Patent
Berggren et al.

(10) Patent No.: US 11,191,009 B2
(45) Date of Patent: Nov. 30, 2021

(54) SELECTION OF TARGET CELL FROM CANDIDATE CELLS BASED ON ACCESS RESTRICTIONS INCLUDING AT LEAST ONE RESPECTIVE REGULATED REPETITION LEVEL FOR EACH CANDIDATE CELL

(71) Applicant: Sony Corporation, Tokyo (JP)

(72) Inventors: Anders Berggren, Lund (SE); Rickard Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/625,059

(22) PCT Filed: Jul. 6, 2018

(86) PCT No.: PCT/EP2018/068395
§ 371 (c)(1),
(2) Date: Dec. 20, 2019

(87) PCT Pub. No.: WO2019/008143
PCT Pub. Date: Jan. 10, 2019

(65) Prior Publication Data
US 2020/0154345 A1    May 14, 2020

(30) Foreign Application Priority Data
Jul. 7, 2017  (SE) .................................... 1730185-4

(51) Int. Cl.
*H04W 48/12*  (2009.01)
*H04W 36/00*  (2009.01)
(Continued)

(52) U.S. Cl.
CPC ..... *H04W 48/12* (2013.01); *H04W 36/00837* (2018.08); *H04W 36/08* (2013.01);
(Continued)

(58) Field of Classification Search
CPC ........... H04W 48/02; H04W 36/00837; H04W 36/08; H04W 36/16; H04W 36/165; H04W 68/005; H04W 72/042
See application file for complete search history.

(56) References Cited

U.S. PATENT DOCUMENTS

2016/0212663 A1   7/2016  Katsunari et al.
2016/0330633 A1*  11/2016  You ...................... H04J 11/0079
(Continued)

FOREIGN PATENT DOCUMENTS

CN    101370269 A    11/2012
CN    102905328 A     1/2013
(Continued)

OTHER PUBLICATIONS

International Search Report and Written Opinion for corresponding Application No. PCT/EP2018/068395, dated Jan. 10, 2018, 18 pages.
(Continued)

*Primary Examiner* — Chi H Pham
*Assistant Examiner* — Vladislav Y Agureyev
(74) *Attorney, Agent, or Firm* — Tucker Ellis, LLP

(57) ABSTRACT

The invention relates to cell re-selection as a consequence of UE mobility in a scenario where coverage enhancement (CE) is employed for multiple repetitions of messages communicated on a wireless link between the UE and the network, and where a CE policy defines a repetition level. Accordingly, a communication device (130) receives at least one downlink control message (6031) from a base station (112, 112-1) of a source cell (181) of a network (100), the at least one downlink control message (6031) being indicative of access restrictions of a plurality of candidate cells (182, 183) of the network (100); more particularly, the at least one downlink control message (6031) is indicative, for each
(Continued)

candidate cell (182, 183) of the plurality of candidate cells (182, 183), of at least one respective regulated repetition level. Based on the at least one downlink control message (6031), the communication device (130) selects a target cell (182, 183) from the plurality of candidate cells (182, 183); and communication between the communication device (130) and a base station (112, 112-2, 112-3) of the target cell (182, 183) is performed.

18 Claims, 16 Drawing Sheets

(51) Int. Cl.
*H04W 36/08* (2009.01)
*H04W 36/16* (2009.01)
*H04W 48/02* (2009.01)
*H04W 68/00* (2009.01)
*H04W 72/04* (2009.01)

(52) U.S. Cl.
CPC ........... *H04W 36/16* (2013.01); *H04W 48/02* (2013.01); *H04W 68/005* (2013.01); *H04W 72/042* (2013.01)

(56) References Cited

U.S. PATENT DOCUMENTS

| | | | |
|---|---|---|---|
| 2016/0353440 A1* | 12/2016 | Lee | H04W 72/0453 |
| 2017/0064670 A1* | 3/2017 | Shen | H04W 4/70 |
| 2018/0092062 A1* | 3/2018 | Chen | H04W 68/00 |
| 2018/0110045 A1* | 4/2018 | You | H04J 11/00 |
| 2018/0249446 A1* | 8/2018 | You | H04L 1/08 |
| 2019/0110241 A1* | 4/2019 | Jain | H04L 1/1887 |
| 2019/0364492 A1* | 11/2019 | Azizi | H04W 52/0264 |
| 2020/0267524 A1* | 8/2020 | Fliess | H04L 1/0047 |

FOREIGN PATENT DOCUMENTS

| | | |
|---|---|---|
| CN | 102088745 A | 5/2015 |
| CN | 105828439 A1 | 8/2016 |
| CN | 104255064 A | 6/2020 |
| EP | 3101937 A1 | 7/2016 |
| WO | 2014113963 A1 | 7/2014 |
| WO | 2015116870 A1 | 6/2015 |
| WO | 2015114693 A1 | 8/2015 |
| WO | 2016114149 A1 | 7/2016 |

OTHER PUBLICATIONS

Ericsson: "Improved Idle Mode Access control for efeMTC and feNB-IoT UEs", 3GPP Draft; R2-1803091—Improved Idle Mode Access Control for EFEMTC and FeNb-IoT UEs, 3rd Generation Partnership Project (3GPP), Mobile Competence Centre; dated Feb. 2, 2018; Retrieved from the internet :URL:http://www.3gpp.org/ftp/tsg%5Fran/WG2%5FRL2/TSGR2%5F101/Docs/ [retrieved on Feb. 16, 2018].

Huawei et al.: Existing solutions for access/load control of idle mode UEs for MTC and NB-IOP, 3GPP Draft R2-1808688 Resubmission of R2-1804827 Existing Solutions for Accessload Control of Idle Mode UEs, 3rd Generation Partnership Project (3GPP), Moble Competence Centre; Dated May 20, 2018; Retrieved from the Internet: URL:http://www.3gpp.org/ftp/Meetings%5F3GPP%5FSYNC/RAN2/Docs/ (retrieved on May 20, 2018).

LG Electronics Inc: "Access barring for CE level", 3GPP Draft; R2-1705675 Access Barring for CE Level (FEMTC), 3rd Generation Partnership Project (3GPP), Mobile Competence Centre; Dated May 14, 2017; Retrieved from the Internet: URL:http://www.3gpp.org/ftp/Meetings -3GPP SYNC/RAN2/Docs/ [retrieved on May 14, 2017].

Office Action for corresponding Chinese application No. 201880045217.0, dated May 31, 2021. 12 pages.

* cited by examiner

Transmit DL control message indicative of access restrictions of a plurality of cells —8011

FIG. 13

SELECTION OF TARGET CELL FROM CANDIDATE CELLS BASED ON ACCESS RESTRICTIONS INCLUDING AT LEAST ONE RESPECTIVE REGULATED REPETITION LEVEL FOR EACH CANDIDATE CELL

TECHNICAL FIELD

Various examples of the invention relate to coverage enhancement using multiple repetitions of messages communicated on a wireless link. Various examples of the invention further relate to cell re-selection.

BACKGROUND

Mobile communication by means of cellular networks is an integral part of modern life. Examples of cellular networks include the Third Generation Partnership Project (3GPP) Long Term Evolution (LTE; sometimes also referred to as 4G) and 3GPP New Radio (NR; sometimes also referred to as 5G) technology. Here, multiple nodes are connected to form the network. The network may include a plurality of cells. Each cell may be associated with one or more base stations (BSs). Communication devices (UEs) may connect to the network through different cells. UE mobility is supported.

A set of features where a comparably large coverage is achieved is referred to as Coverage Enhancement (CE). CE is envisioned to be applied for Machine Type Communication (MTC) and the Narrowband IoT (NB-IOT), sometimes also referred to as NB-LTE. For example, such techniques may be based on the 3GPP LTE technology to some extent and may reuse some of the LTE concepts.

A key feature of the CE is to implement multiple transmission repetitions of messages; thereby multiple repetitions of encoded data are facilitated. Here, each repetition may include the same redundancy version of the message. The repetitions may be "blind", i.e., may not in response to a respective retransmission request that may be defined with respect to a Hybrid Acknowledgment Repeat Request protocol (HARQ protocol). Rather, repetitions according to CE may be preemptive. Examples are provided by the 3GPP Technical Report (TR) 45.820 version 13.0.0 (2015-08), section 6.2.1.3. By employing an appropriate CE policy, a likelihood of successful transmission can be increased even in scenarios of poor conditions of communicating on a corresponding wireless link. Robustness against channel fading is increased. Thereby, the coverage of networks can be significantly enhanced—even for low transmission powers as envisioned for the MTC and MB-IOT domain.

However, CE may face certain restrictions and drawbacks. For example, due to the multiple transmission repetitions, increased system load can result. In particular, due to the multiple transmission repetitions, an increased amount of resources in time and frequency domain (time-frequency resources) is required to transmit a message. Typically, the amount of time-frequency resources required scales linearly with the repetition level of the employed CE policy. Thus, larger/smaller repetition levels result in larger/smaller system load.

Furthermore, the latency of communicating messages may increase. In particular, the time duration required to successfully deliver the message may also scale linearly with the repetition level of the CE policy.

Such restrictions and drawbacks may have significant impacts on the reliability of communication, in particular in mobility scenarios where the UE moves from cell to cell of the network. This applies, in particular, to CE-associated access barring, see, e.g., 3GPP RP-170732, "Even further enhanced MTC for LTE", 3GPP TSG RAN Meeting #75, Dubrovnik, Croatia, Mar. 6-9, 2017 where the UE is to refrain from connection attempts to a cell which implements such access restrictions. US 2010 0159928 A1 discloses techniques associated with access restrictions.

SUMMARY

Therefore, a need exists for advanced techniques of restricting access to cells. In particular, a need exists for techniques which mitigate or overcome at least some of the above-identified restrictions and drawbacks.

This need is met by the features of the independent claims. The features of the dependent claims define embodiments.

A method of operating a communication device includes receiving at least one downlink control message from a base station of a source cell of a network. The at least one downlink control message is indicative of access restrictions of a plurality of candidate cells of the network. The method further includes selecting a target cell from the plurality of candidate cells based on the at least one downlink control message. The method further includes communicating between the communication device and a base station of the target cell.

A computer program product includes program code that may be executed by at least one processor. Executing the program code may cause the at least one processor to perform a method of operating a communication device. The method includes receiving at least one downlink control message from a base station of a source cell of a network. The at least one downlink control message is indicative of access restrictions of a plurality of candidate cells of the network. The method further includes selecting a target cell from the plurality of candidate cells based on the at least one downlink control message. The method further includes communicating between the communication device and a base station of the target cell.

A computer program includes program code that may be executed by at least one processor. Executing the program code may cause the at least one processor to perform a method of operating a communication device. The method includes receiving at least one downlink control message from a base station of a source cell of a network. The at least one downlink control message is indicative of access restrictions of a plurality of candidate cells of the network. The method further includes selecting a target cell from the plurality of candidate cells based on the at least one downlink control message. The method further includes communicating between the communication device and a base station of the target cell.

A communication device includes control circuitry. The control circuitry is configured to perform: receiving at least one downlink control message from a base station of a source cell of a network. The at least one downlink control message is indicative of access restrictions of a plurality of candidate cells of the network. The method further includes selecting a target cell from the plurality of candidate cells based on the at least one downlink control message. The method further includes communicating between the communication device and a base station of the target cell.

A method includes transmitting at least one downlink control message from a base station of a source cell of a network to a communication device. The at least one downlink control message is indicative of access restrictions of a plurality of candidate cells of the network.

A computer program product includes program code that may be executed by at least one processor. Executing the program code may cause the at least one processor to perform a method. The method includes transmitting at least one downlink control message from a base station of a source cell of a network to a communication device.

The at least one downlink control message is indicative of access restrictions of a plurality of candidate cells of the network.

A computer program includes program code that may be executed by at least one processor. Executing the program code may cause the at least one processor to perform a method. The method includes transmitting at least one downlink control message from a base station of a source cell of a network to a communication device. The at least one downlink control message is indicative of access restrictions of a plurality of candidate cells of the network.

A base station includes control circuitry configured to perform: transmitting at least one downlink control message from a base station of a source cell of a network to a communication device. The at least one downlink control message is indicative of access restrictions of a plurality of candidate cells of the network.

A method of operating a communication device includes receiving at least one downlink control message from a base station of a source cell of a network, the at least one downlink control message being indicative of access restrictions of a plurality of candidate cells of the network. The method further includes selecting a target cell from the plurality of candidate cells based on the at least one downlink control message.

The method further includes camping on the target cell.

A computer program product includes program code that may be executed by at least one processor. Executing the program code may cause the at least one processor to perform a method of operating a communication device. The method includes receiving at least one downlink control message from a base station of a source cell of a network, the at least one downlink control message being indicative of access restrictions of a plurality of candidate cells of the network. The method further includes selecting a target cell from the plurality of candidate cells based on the at least one downlink control message. The method further includes camping on the target cell.

A computer program includes program code that may be executed by at least one processor. Executing the program code may cause the at least one processor to perform a method of operating a communication device. The method includes receiving at least one downlink control message from a base station of a source cell of a network, the at least one downlink control message being indicative of access restrictions of a plurality of candidate cells of the network. The method further includes selecting a target cell from the plurality of candidate cells based on the at least one downlink control message. The method further includes camping on the target cell.

A method of operating a communication device includes, in connected mode, receiving at least one downlink control message from a base station of a source cell of a network. The the at least one downlink control is indicative of access restrictions of at least one candidate cell of the network which is different from the source cell.

A computer program product includes program code that may be executed by at least one processor. Executing the program code may cause the at least one processor to perform a method of operating a communication device. The method includes, in connected mode, receiving at least one downlink control message from a base station of a source cell of a network. The at least one downlink control is indicative of access restrictions of at least one candidate cell of the network which is different from the source cell.

A computer program includes program code that may be executed by at least one processor. Executing the program code may cause the at least one processor to perform a method of operating a communication device. The method includes, in connected mode, receiving at least one downlink control message from a base station of a source cell of a network. The the at least one downlink control is indicative of access restrictions of at least one candidate cell of the network which is different from the source cell.

It is to be understood that the features mentioned above and those yet to be explained below may be used not only in the respective combinations indicated, but also in other combinations or in isolation without departing from the scope of the invention. For illustration, it would be possible that techniques of signalling access restrictions of one or more cells in connected mode—e.g., using RRC control signalling—are combined with techniques of regulated repetition levels for CE.

BRIEF DESCRIPTION OF THE DRAWINGS

FIG. 13 is a flowchart of a method according to various exmaples.

DETAILED DESCRIPTION OF EMBODIMENTS

Figure 1:
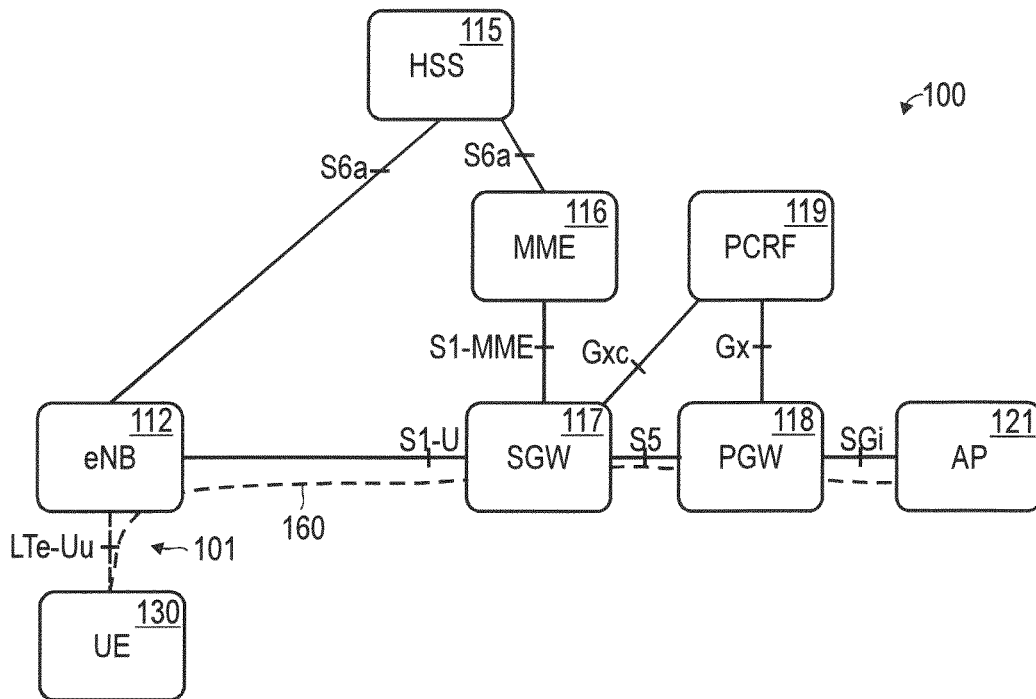
FIG. 1 schematically illustrates a network according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of facilitating UE mobility in a network are described. For example, UE mobility may be facilitated in a cellular network. According to various examples, UE mobility is facilitated in a scenario where a CE policy is employed for transmitting and/or receiving (communicating) messages between the UE and the network. The CE policy may define a repetition level. Messages or signals including a given redundancy version of encoded data are repeatedly communicated according to the repetition level: According to examples, a message—e.g., a paging message—is redundantly communicated using a plurality of repetitions. The message may include data which is encoded according to one and the same redundancy version: Hence, the same encoded data may be redundantly communicated a number of times according to various examples. Each repetition of the plurality of repetitions can include the data encoded according to the same redundancy version, e.g., redundancy version 0 or redundancy version 1, etc. Then, it is possible to combine the plurality of repetitions of the encoded data at the receiver side. I.e., multiple received instances of the message may be combined. Such combination may be implemented in analog or digital domain, e.g., in the baseband. The combination yields a combined signal. Then, the decoding of the encoded data can be based on the combined signal. Thus, by aggregating the received information across the multiple repetitions, the probability of successfully decoding of the encoded signal increases. This facilitates CE. The count of repetition is sometimes referred to as the repetition level or CE level. Such techniques of CE may find particular application in the framework of the IoT technology, e.g., according to 3GPP MTC or NB-IoT. Here, typically, the transmitting UE implements a comparably low transmit power. Due to the multiple repetitions of the message, nonetheless, a sufficiently high likelihood of successfully receiving the message is provided for.

Due to employing a CE policy, the network load may increase. In order to avoid overload scenarios, sometimes, access barring (AB) may be employed. Here, the UE does not make connection attempts to a barred cell. According to an AB, access restrictions may be implemented by the cells of a network. Different cells of the network may implement different access restrictions. Access restrictions may, in particular, apply to connected mode of the UE: e.g., set-up of a data connection using a random access procedure may be restricted.

According to various examples, advanced techniques of restricting access to a cell are described. Techniques are described which reduce negative impacts of access restrictions on connectivity. Increased latency is avoided.

An example access restriction given by 3GPP TS 22.011 version 15.0.0 (2017-03), section 4 "Access Control". Here, all UEs are members of one out of 10 randomly allocated mobile populations, defined as access classes 0 to 9. The population number is stored in the subscriber identity module (SIM). Access restrictions are defined with respect to the access classes.

The techniques described herein are not limited to such legacy access restrictions, e.g., as described by 3GPP TS 22.011 version 15.0.0 (2017-03). Rather, it would be possible to implement other access restrictions, e.g., access restrictions defined with respect to repetition levels of the employed CE policies. Thereby, it may be possible to regulate the employed repetition levels. For example, in high-load scenarios, it could be possible to specify regulated repetition levels to thereby restrict access of such UEs which employ a CE policy using large repetition levels. Access restrictions may apply for some of the regulated repetition levels; while no access restrictions may apply for others of the regulated repetition levels.

Various techniques are based on the finding that employing AB in connection with CE policies can lead to increased latency when the UE re-selects the cell due to mobility—i.e., when the UE switches from camping on a source cell to camping on a target cell. This applies to idle mode where a data connection is not set up. In reference implementations, UE may test if a candidate cell is suitable for camping on, i.e., tests whether a candidate cell qualifies as the target cell. For example, the UE may receive a downlink (DL) control message from a candidate cell, the DL control message being indicative of the access restriction employed by this cell. Then, due to the multiple repetitions of the DL control message to be received by the UE according to the CE policy, the duration until successful delivery of the DL control message can be significant. Hence, only after this significant duration the UE is informed about the access restriction that applies for the candidate cell. Thus, according to such reference implementations, the time duration required for testing whether a candidate cell is appropriate to be selected by the UE as target cell increases significantly due to CE. This may negatively affect the connectivity.

Techniques are described, which enable to mitigate such restrictions of the reference implementations.

According to examples, the UE receives a DL control message from a BS of the source cell. The DL control message is indicative of access restrictions of a plurality of candidate cells of the network. Then, the UE is configured to select a target cell from the plurality of candidate cells based on the DL control message. The UE can then communicate with the target cell. Hence, in such a scenario information of potential access restrictions applying for a plurality of candidate cells is already received by the UE from the source cell; instead of, only at a later stage, from the respective candidate cell. The UE may then select the target cell in accordance with the access restrictions.

Selecting the target cell in accordance with the access restrictions can correspond to not selecting a candidate cell as target cell if, otherwise, access restrictions would be violated. For example, a target cell may not be selected for camping on in idle mode, if access restrictions apply in connected mode.

In detail, the access restrictions may, in particular, apply to connected mode. For example, certain access restrictions may limit the capability of setting up a data connection with the various candidate cells. Then, even in idle mode, it may be avoided to select the target cell if transition to connected mode would be limited for that target cell. For example, a certain repetition levels of CE policies supported by a candidate cell may be regulated for connected mode. Then, a candidate cell which does not support the preferred repetition level may not be selected (in idle mode or connected mode).

In some examples, it would be possible that the target cell is selected according to concepts of limited access. Here, if the access restrictions apply to connected mode, still camping on a cell having relevant access restrictions in place may be performed by the UE in idle mode. The UE may follow the access restrictions for any attempt to set-up a data connection, i.e., when attempting to transition to connected mode, e.g., by using random access. For example, the UE may monitor the status of the access restrictions and only initiate a random access procedure in case the access restrictions are currently not barring the UE. Such a scenario may be particularly helpful where access restrictions specifying regulated repetition levels of a CE policy are employed. For example, here it may be possible that—e.g., due to UE mobility—the repetition level required to reliably communicate changes over the course of time with changing signal quality. Then, camping on the target cell which implements an access restriction with respect to a regulated repetition level may offer the perspective that it is possible to select a non-restricted repetition level once a data connection is required to be established, e.g., due to an interim improvement in the signal quality which also enables to use low repetition levels.

In the various scenarios described above, it is not required to wait for reception of multiple repetitions of a DL control message from each of the candidate cells before information on the access restrictions of the respective candidate cell is obtained by the UE; rather, that information on the access restrictions of the candidate cells may be obtained by the UE when camping on the source cell. This facilitates efficient and quick cell re-selection.

Hence, according to the techniques described herein, the cell re-selection procedure may be optimized, in particular for battery-constrained devices. This is achieved by receiving a DL control message being indicative of access restrictions of a plurality of candidate cells—e.g., neighboring to the source cell—from the source cell. By such optimized cell re-selection procedures, the power consumption of the UE may be reduced. This helps to prolong battery life.

FIG. 1 illustrates aspects with respect to the architecture of a cellular network 100 according to some examples implementations. In particular, the cellular network 100 according to the example of FIG. 1 implements the 3GPP LTE architecture, sometimes referred to as evolved packet system (EPS). This, however, is for exemplary purposes only. In particular, various scenarios will be explained in the context of a wireless link 101 between a UE 130 and the cellular network 100 operating according to the 3GPP LTE radio access technology (RAT) for illustrative purposes only. Similar techniques can be readily applied to various kinds of 3GPP-specified RATs, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks. The network 100 may be operating according to the 3GPP NR framework.

A further particular example is the 3GPP NB-IoT RAT. The 3GPP NB-IoT RAT may be based on the 3GPP LTE RAT, i.e., the Evolved UMTS Terrestrial Radio Access (E-UTRA). Further, the NB-IoT RAT may be combined with the EPS as illustrated in FIG. 1. The various examples disclosed herein may be readily implemented for the 3GPP NB-IoT RAT, alternatively or additionally. Similarly, the techniques described herein may be employed for MTC.

Other examples include other types of networks, e.g., Institute of Electrical and Electronics Engineers (IEEE) 802.11X Wireless Local Area Network, Bluetooth or Zigbee.

The 3GPP LTE RAT implements a HARQ protocol. The HARQ protects data communicated via the wireless link 101. FEC and retransmission are employed in this respect.

The UE 130 is connected via the wireless link 101 to a BS 112 of the cellular network 100. The BS 112 and the UE 130 implement the evolved UMTS terrestrial radio access technology (E-UTRAN); therefore, the BS 112 is labeled evolved node B (eNB) in FIG. 1.

For example, the UE 130 may be selected from the group including: a smartphone; a cellular phone; a table; a notebook; a computer; a smart TV; a MTC device, an IoT device; etc.

An MTC or IoT device is typically a device with a low to moderate requirement on data traffic volumes and loose latency requirements. Additionally, communication employing MTC or IoT devices should achieve low complexity and low costs. Further, energy consumption of an MTC or an IoT device should be comparably low in order to allow battery-powered devices to function for a comparably long duration: The battery life should be sufficiently long. For example, the IoT device may be connected to the EPS via the NB-IoT RAT.

Communication on the wireless link 101 can be in UL and/or DL direction. Details of the wireless link 101 are illustrated in FIG. 2.

Figure 2:
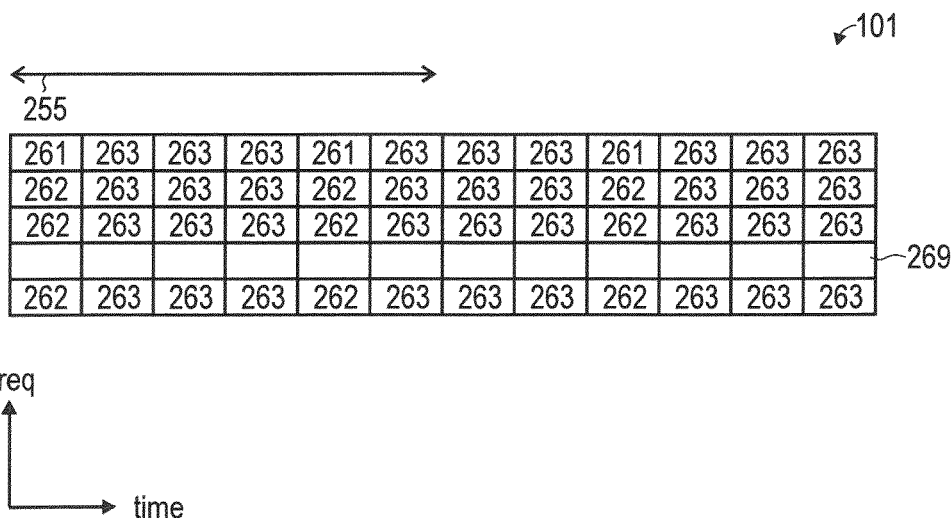
FIG. 2 schematically illustrates time-frequency resources arranged in a resource grid and allocated to various channels implemented on a wireless link between a UE and the network.

FIG. 2 illustrates aspects with respect to channels 261-263 implemented on the wireless link 101. Transmission frames 255—e.g., implemented by subframes—occupy a certain time duration. Each channel 261-263 includes a plurality of time-frequency resources 269 which are defined in time domain and frequency domain. For example, the resources 269 may be defined with respect to symbols encoded and modulated according to Orthogonal Frequency Division Multiplexing (OFDM). The time-frequency resources are arranged in a time-frequency resource grid. Not all resources 269 are allocated by the channels 261-263.

For example, a first channel 261 may be reserved for paging messages. Paging messages may be used by the network 100 to page the UE 130 in idle mode when the data connection 160 is not established. The UE 130 may then selectively listen to the channel 261 when in idle mode. Such an operation of the UE 130 is sometimes referred to as the UE 130 camping on a given cell.

A second channel 262 may be associated with control messages (control channel 262). The control messages may configure operation of the UE 130, the BS 112, and/or the wireless link 101. For example, radio resource control (RRC) messages and/or HARQ ACKs and NACKs can be exchanged via the control channel. Further, the channel 262 may be used to broadcast messages, e.g., information blocks such as master information blocks (MIBs) and system information blocks (SIBs). Information blocks may include cell-specific information, e.g., the cell identify or access restrictions. Such broadcasted information blocks may be used by the UE in connection with cell re-selection and/or random access. According to E-UTRAN RAT, the channel 262 may be a Physical Downlink Control Channel (PDCCH) or Physical Broadcast Channel (PBCH).

Further, a third channel 263 is associated with a payload messages carrying higher-layer user-plane data packets associated with a given service implemented by the UE 130 and the BS 112 (payload channel 263). According to the E-UTRAN RAT, the payload channel 263 may be a Physical DL Shared Channel (PDSCH) or a Physical UL Shared Channel (PUSCH).

Turning again to FIG. 1, the BS 112 is connected with a gateway node implemented by a serving Gateway (SGW) 117. The SGW 117 may route and forward payload data and may act as a mobility anchor during handovers of the UE 130.

The SGW 117 is connected with a gateway node implemented by a packet data network Gateway (PGW) 118. The PGW 118 serves as a point of exit and point of entry of the cellular network 110 for data towards a packet data network (PDN; not shown in FIG. 1): for this purpose, the PGW 118 is connected with an access point node 121 of the packet data network. The access point node 121 is uniquely identified by an access point name (APN). The APN is used by the UE 130 to seek access to the packet data network.

The PGW 118 can be an endpoint of an end-to-end connection 160 for packetized payload data of the UE 130. The end-to-end connection 160 may be used for communicating payload data of a particular service. Different services may use different end-to-end connections 160 or may share, at least partly, a certain end-to-end connection.

The end-to-end connection 160 may be implemented by one or more bearers which are used to communicate service-specific data. An EPS bearer which is characterized by a certain set of quality of service parameters indicated by the QoS class identifier (QCI).

Figure 3:
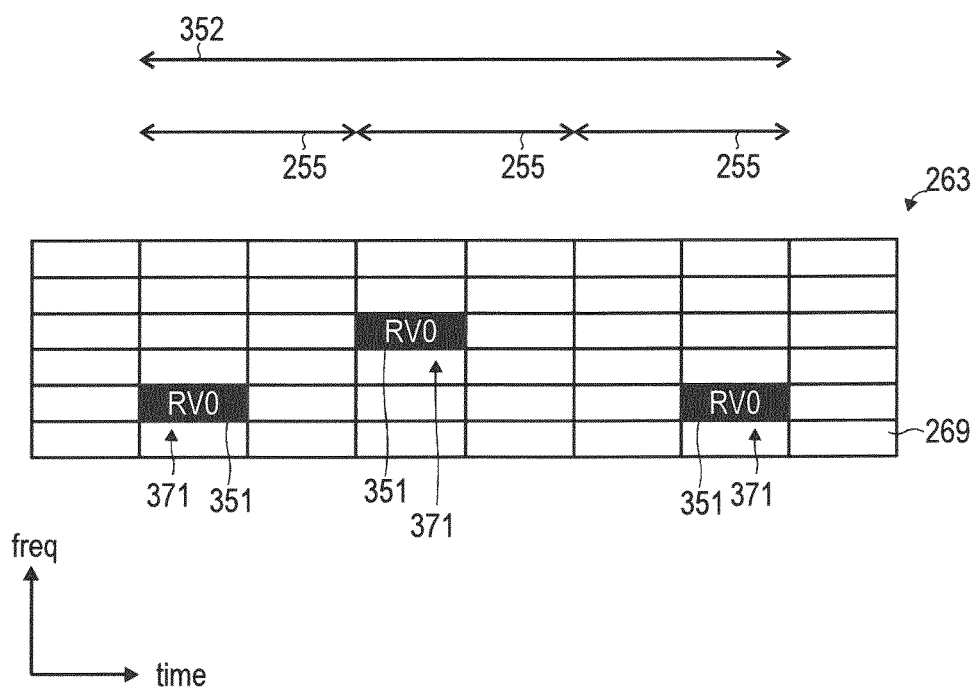
FIG. 3 schematically illustrates multiple repetitions of a message according to a CE policy and according to various examples.

FIG. 3 illustrates aspects with respect to a CE technique. In particular, FIG. 3 illustrates aspects with respect to multiple repetitions 351 of data encoded according to a redundancy version 371. As can be seen from FIG. 3, the plurality of repetitions 351 are communicated in subsequent subframes 255 of the channel 263. The transmission burst of the repetitions 351 has a certain duration 352.

While in the scenario of FIG. 3 the transmission burst includes subsequent repetitions 351 of the encoded data in subsequent subframes 255. In other examples, it is also possible that subsequent repetitions are not arranged contiguously with respect to the subframes 255, i.e., there may be intermittent subframes not occupied by a repetition of the encoded data of the transmission burst (not shown in FIG. 3). In other examples it would be possible that subsequent repetitions 351 are arranged within a single subframe 255 (not shown in FIG. 3).

The specific time-frequency arrangement of the repetitions 351 is illustrated in the example of FIG. 3 is an example only. Other examples are possible.

While in the scenario of FIG. 3 encoded data is communicated on the payload channel 263, similar techniques may be readily applied to other kinds and type of data, e.g., control data on the channel 262 and paging messages on the channel 261.

Figure 4:
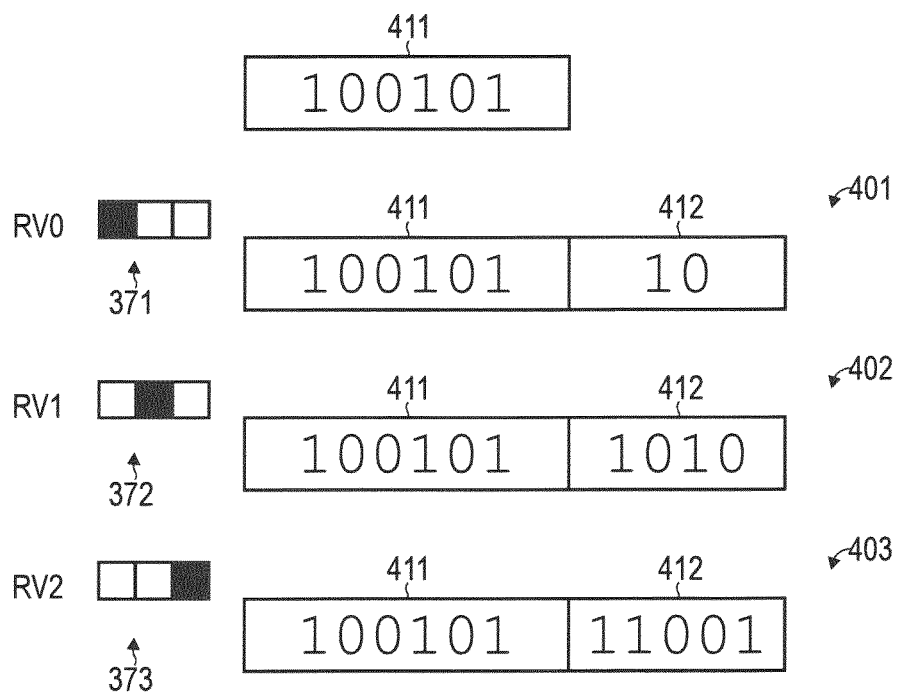
FIG. 4 schematically illustrates redundancy versions of encoded data to be included in messages which are repeated multiple times according to the CE policy and according to various examples.

FIG. 4 illustrates aspects of encoding data 401-403 according to different redundancy versions 371-373. The data may be included in a message. As can be seen from FIG. 4, the raw data 411 includes a sequence of bits. For example, the data 411 can be a data packet, e.g., a MAC layer Service Data Unit (SDU). For example, the data 411 may correspond to a RRC command or other control data.

Encoding the data 411 can correspond to adding a checksum 412 to the data 411 to yield the encoded data 401-403, i.e., respective messages to be communicated on the wireless link 101.

Different techniques of encoding can be employed such as, e.g., Reed Solomon encoding, turbo convolutional encoding, convolutional coding, etc. Provisioning the checksum 412 can facilitate reconstruction of corrupted bits of the corresponding message 401-403 according to the coding scheme. Typically, the longer (shorter) the checksum 412, the more (less) robust the communication of the corresponding message 401-403 against noise and channel imperfections; thus, a probability for successful transmission of the data 411 can be tailored by the length of the checksum. Alternatively or additionally, encoding the data can correspond to applying interleaving where the bits of the data 411 are shuffled (not shown in FIG. 4).

Typically, different redundancy versions 371-373 correspond to checksums 412 of different length (as illustrated in FIG. 4). In other examples, it would also be possible that different redundancy version 371-373 employ checksums 412 of the same length, but encoded according to the different coding scheme. Alternatively or additionally, different redundancy versions may employ different interleaving schemes. Alternatively or additionally, different redundancy versions may employ different puncturing schemes.

Hereinafter, an example implementation of constructing different redundancy versions is given.

STEP 1 of constructing different redundancy versions: A block of information bits, i.e., the raw data 411 to be transmitted, is encoded. Here, additional redundancy bits are generated, i.e., in addition to the data 411. Let N denote the number of information bits; then—e.g., for E-UTRA RAT—the total number of the encoded bits (i.e., the sum of information bits and redundancy bits) may amount to 3N. A decoder that receives all 3N bits typically is able to decode the information bits, even if a large number of bit errors is present in the received bits due to a high BER.

STEP 2 of constructing different redundancy versions: Thus, in order to avoid excessive overhead of transmission, only a fraction of the redundancy bits is selected. The information bits and the selected redundancy bits form the first redundancy version 371. The amount of encoded bits according to the first redundancy version is 371 therefore, using the above example, somewhere between N and 3N. The process of removing redundancy bits by selecting the fraction is sometimes referred to as puncturing. This first redundancy version 371 may then be sent to the receiver.

STEP 3 of constructing different redundancy versions: In case a retransmission is required according to the HARQ protocol, a new redundancy version 372, 373 is sent. The higher order redundancy version 372, 373 includes additional redundancy bits from the ones that were previously punctured in step 2, and typically the same information bits again. In this way, after a couple of repetitions the whole 3N bits have been sent at least once.

Figure 5:
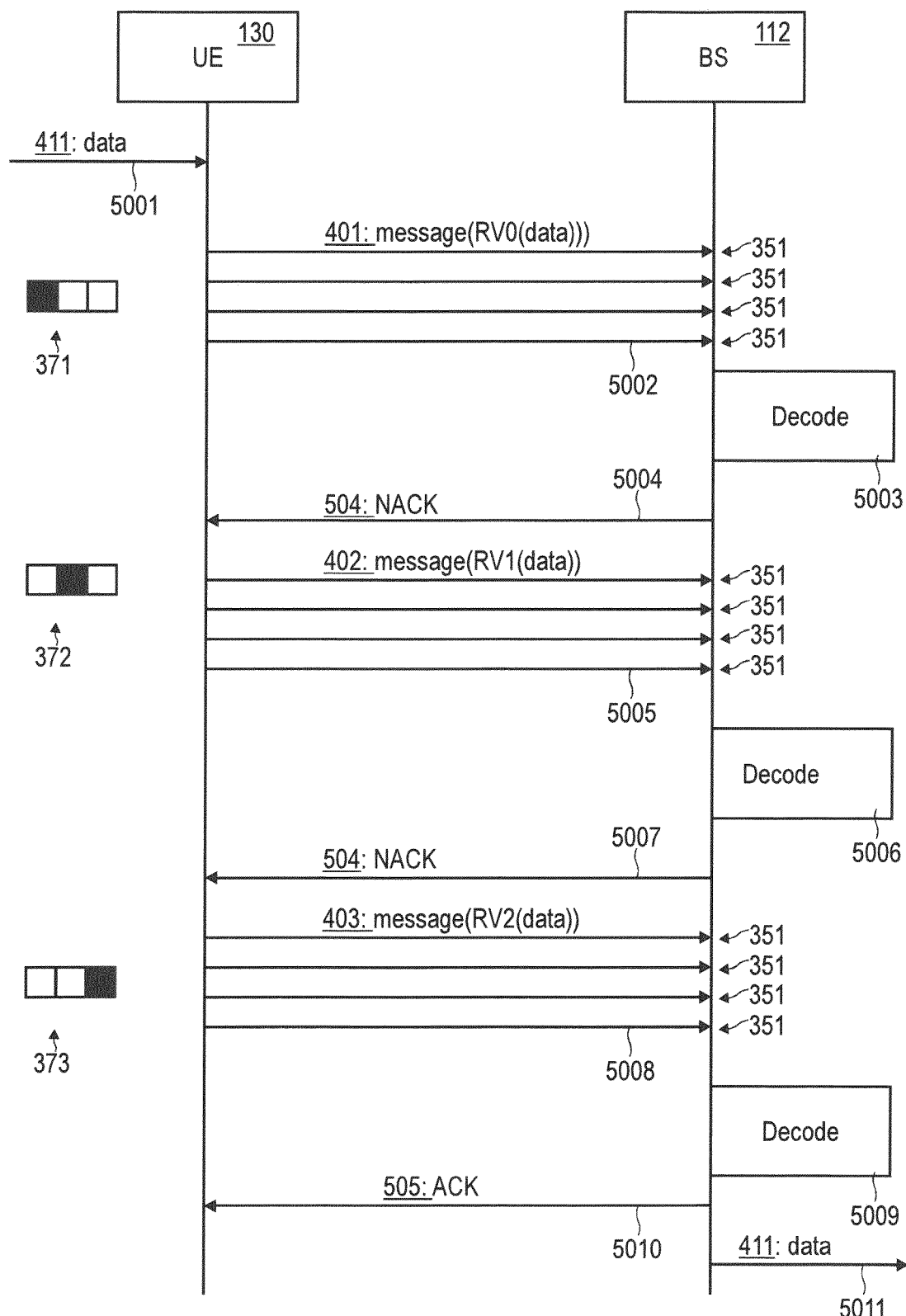
FIG. 5 schematically illustrates multiple repetitions of messages according to a CE policy and according to various examples.

FIG. 5 illustrates aspects of the HARQ protocol implemented by the MAC layer (generally, Layer 2) of the transmission protocol stack of the UE 130 and the BS 112, respectively. The HARQ protocol according to the example of FIG. 5 employs a CE policy defining a repetition level of multiple repetitions 351 of messages 401-403 including data 411 encoded according to redundancy versions 371-373.

At 5001, the raw data 411 is received, e.g., from a higher layer at the transmit buffer implemented by the UE 130. The data 411 is encoded to yield the encoded data.

Then, multiple repetitions 351 of a message 401 including the data 411 encoded according to the redundancy version 371 are transmitted by the UE 130, 5002. This is according to the CE policy employed for communication between the UE 130 and the BS 112.

Then, the BS 112 attempts to decode the message 401, 5003. Decoding at 5003 is based on a combination of the multiple repetitions 351 of the message 401 encoded according to the redundancy version 371. This helps to increase the probability of successfully decoding the message 411. In the example of FIG. 5, decoding fails at 5003 and, consequently, the BS 112 sends a negative acknowledgment message 504 to the UE 130 at 5004.

The UE 130 receives the negative acknowledgment message 504 and transmits a message 402 at 5005, the message 402 including multiple repetitions 351 of the data 411 now encoded according to the redundancy version 372.

Then, at 5006, decoding—which is based on a combination of the multiple repetitions 351 of the message 402—again fails and the BS 112, at 5007, transmits another negative acknowledgment message 504.

The negative acknowledgment message 504 is received by the UE 130 which, in response to reception of the negative acknowledgment message 504, transmits multiple repetitions 351 of a message 403 including the data 411 encoded according to the redundancy version 373, 5008.

Then, at 5009, decoding—which is based on the combination of the multiple repetitions 351 of the message 403 included in the signal 5008—is successful and, consequently, the BS 112 transmits a positive acknowledgment message 505 at 5010 to the UE 130. Then, the decoded data 411 can be passed to higher layers at 5011, e.g., from a receive buffer of the BS 112.

FIG. 5 is an example of communication of the data 411 in UL direction. Similar techniques may be readily applied for communication and DL direction. Also, multiple repetitions 351 of other messages, e.g., paging messages or information blocks, may be employed.

FIG. 5 illustrates aspects with respect to communicating multiple repetitions 351 in accordance with a repetition level of a CE policy of messages 401-403 on the payload channel 263. The data 411 may be payload data. Such techniques find particular application when the data connection 160 is set up between the UE 130 and the network 100, i.e., when the UE 130 is operated in connected mode. However, employing multiple repetitions in accordance with a repetition level of a CE policy is not limited to connected mode; likewise, it would be possible that multiple repetitions are communicated in other modes, such as idle mode. For example in idle mode, a CE policy may be employed to communicate information blocks such as system information locks broadcasted, paging messages, and messages associated with random access.

Figure 6:
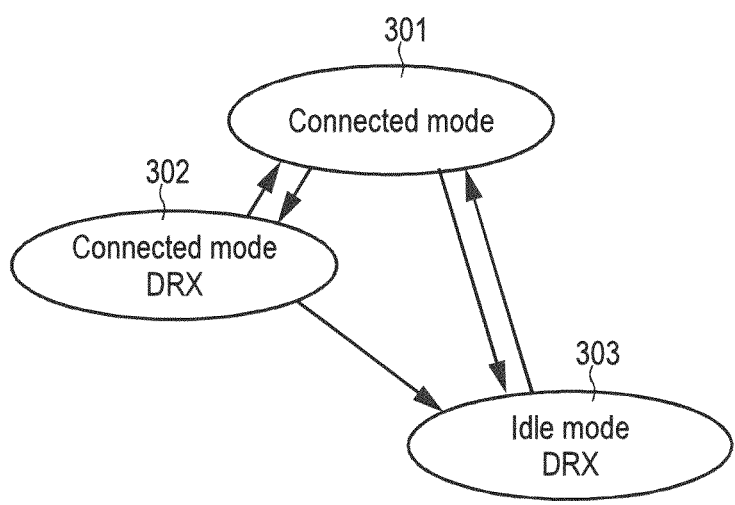
FIG. 6 schematically illustrates various modes in which a UE is operated according to various examples.

FIG. 6 illustrates aspects with respect to different modes 301-303 in which the UE 130 can be operated.

In connected mode 301, the data connection 160 is set up. For example, a default bearer and optionally one or more dedicated bearers may be set up between the UE 130 and the network 100.

For example, in connected mode 301, the repetition level of the CE policy may be negotiated between the UE 130 and the respective BS 112. For example, regulated repetition levels may be associated with selective access restrictions. Then, the repetition level may be selected to meet these access restrictions.

Access restrictions may, in particular, apply to the connected mode 301. For example, the access restrictions may not allow for the data connection 160 being set up.

In order to reduce the power consumption, it is then possible to transition from the connected mode 301 to a connected mode 302 which employs a discontinuous reception (DRX) cycle (Connected mode DRX). The DRX cycle includes on durations and off durations. During the off durations, an interface of the UE 130 is unfit to receive data; e.g., an analog and/or digital frontend may at least be partially powered down. The timing of the DRX cycle is synchronized between the UE 130 and the BS 112 such that the BS 112 can align any DL transmission with the on durations of the connected mode DRX cycle. The data connection 160 is maintained established in mode 302. The data connection 160 is not released.

To achieve a further power reduction, it is possible to transition into idle mode 303. The idle mode 303 is, again, associated with an idle mode DRX cycle of the UE 130. However, during the on durations of the DRX cycle in idle mode 303, the interface of the UE 130 is only fit to receive paging messages on the channel 261. For example, this may help to restrict the frequency bandwidth that needs to be monitored by the UE during the on durations of the DRX cycles in idle mode 303. This may help to further reduce the power consumption—e.g., if compared to the connected mode 302.

For example, in idle mode, a default repetition level of a CE policy may be used. In particular, downlink paging messages may be transmitted by the respective BS 112 using this default repetition level.

When using concepts of limited access, it is possible that a UE 130 operated in idle mode 303 camps on a cell which implements access restrictions for connected mode 301.

To achieve even further power reduction, an extended idle mode DRX cycle may be configured for the UE. Alternatively, the UE may be configured to enter a power save mode, where the UE is only listening for paging in conjunction with so-called tracking area update messages. Extended idle mode and power save mode are example implementations of the idle mode 303.

In idle mode, UE mobility may occur, wherein the UE typically does not report cell re-selection. Rather, a tracking area may be defined which includes multiple cells of the network 100 and network paging may be initiated in the cells of a tracking area to account for potential UE mobility. If the UE listens for DL paging messages from the network at a given cell, it is said that the UE camps on that given cell.

Figure 7:
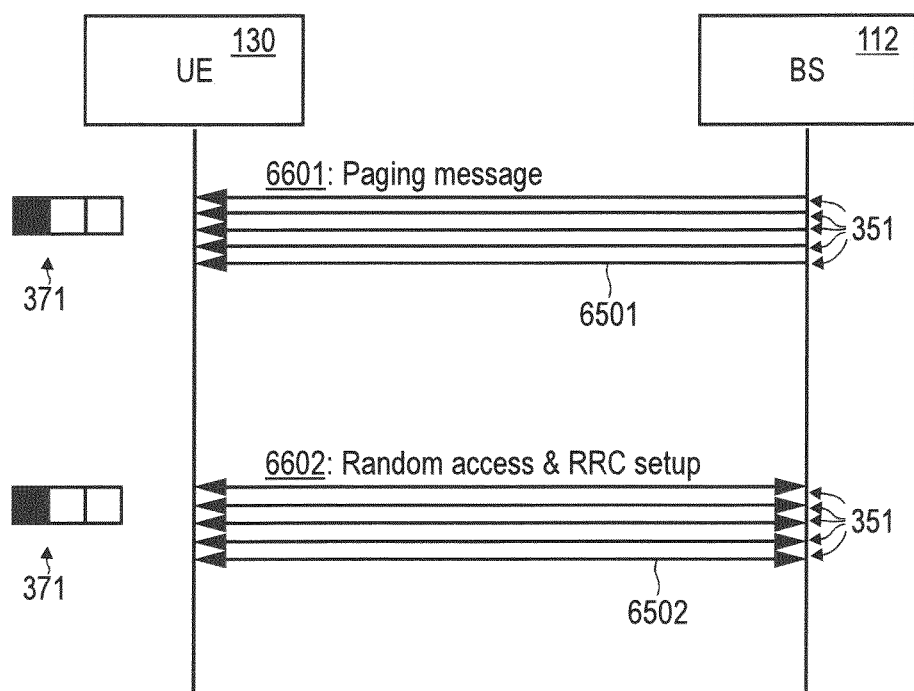
FIG. 7 schematically illustrates network paging of a UE according to various examples.

FIG. 7 illustrates aspects with respect to the network 100 paging the UE 130. FIG. 7 is a signaling diagram of communication between the UE 130 and the BS 112. The UE 130 is operated in idle mode 303.

At 6501, the BS 112 transmits multiple repetitions 351 of a paging message 6601. This is in accordance with a repetition level of a CE policy. This may be a pre-set CE policy employed by the BS 112 which has not pre-negotiated with the UE 130. In other examples, the CE policy may have been negotiated between the BS 112 and the UE 130 prior to the UE 130 transitioning into idle mode 303, e.g., using RRC control messages on channel 262.

The UE 130 then decodes a combination of the multiple repetitions 351 of the paging message 6601 and identifies the paging message 6601 is being addressed to the UE 130. Then, at 6502, a random access procedure in the setup of the data connection 160 is performed. Typically, this includes multiple uplink control messages and multiple DL control messages 6602 (illustrated in a simplified manner in FIG. 7 for brevity). Again, the various uplink control messages and DL control messages communicated in 6502 can be communicated using multiple repetitions in accordance with the repetition level of the CE policy. The UE 130 finally transitions into connected mode 301, 302.

As illustrated in FIG. 7, the CE policy facilitates reliable paging and set-up of the data connection 160.

Figure 8:
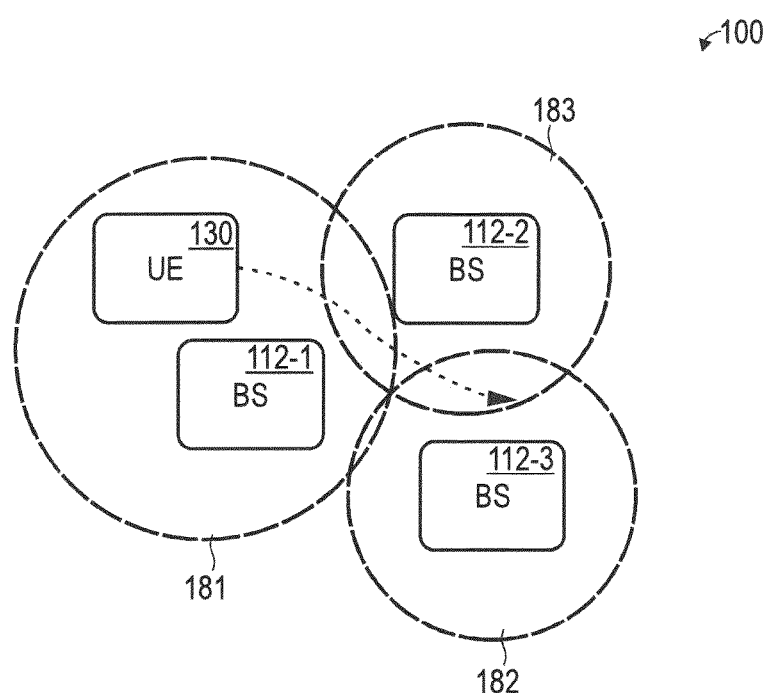
FIG. 8 schematically illustrates multiple cells of the network according to various examples.

FIG. 8 illustrates aspects with respect to multiple cells 181-183 of the network 100. Each cell 181-183 is associated with the respective BS 112-1-112-3; in other scenarios, a cell 181-183 may also be associated with more than one BS.

UE mobility may be defined as the UE 130 moving across boundaries of the various cells 181-183 (dotted arrow in FIG. 8). For example, if the UE 130 is being operated in connected mode 301, 302 when UE mobility occurs, handovers may be employed. For example, if the UE 130 is being operated in idle mode 303 when UE mobility occurs, cell re-selection may be employed. Typically, the logic for controlling the handovers primarily resides at the involved BSs 112-1-112-3. Differently, the logic for cell re-selection may primarily or completely reside at the UE 130. The network 100 may not be informed when the UE 130 decides to stop camping on the source cell 181 and to start camping on the target cell 182-183. This is why typically multiple cells 181-183 are associated with the tracking area; then, paging messages 6601 can be transmitted by all BSs associated with the tracking area, thereby increasing the likelihood of successfully reaching the UE 130.

Figure 9:
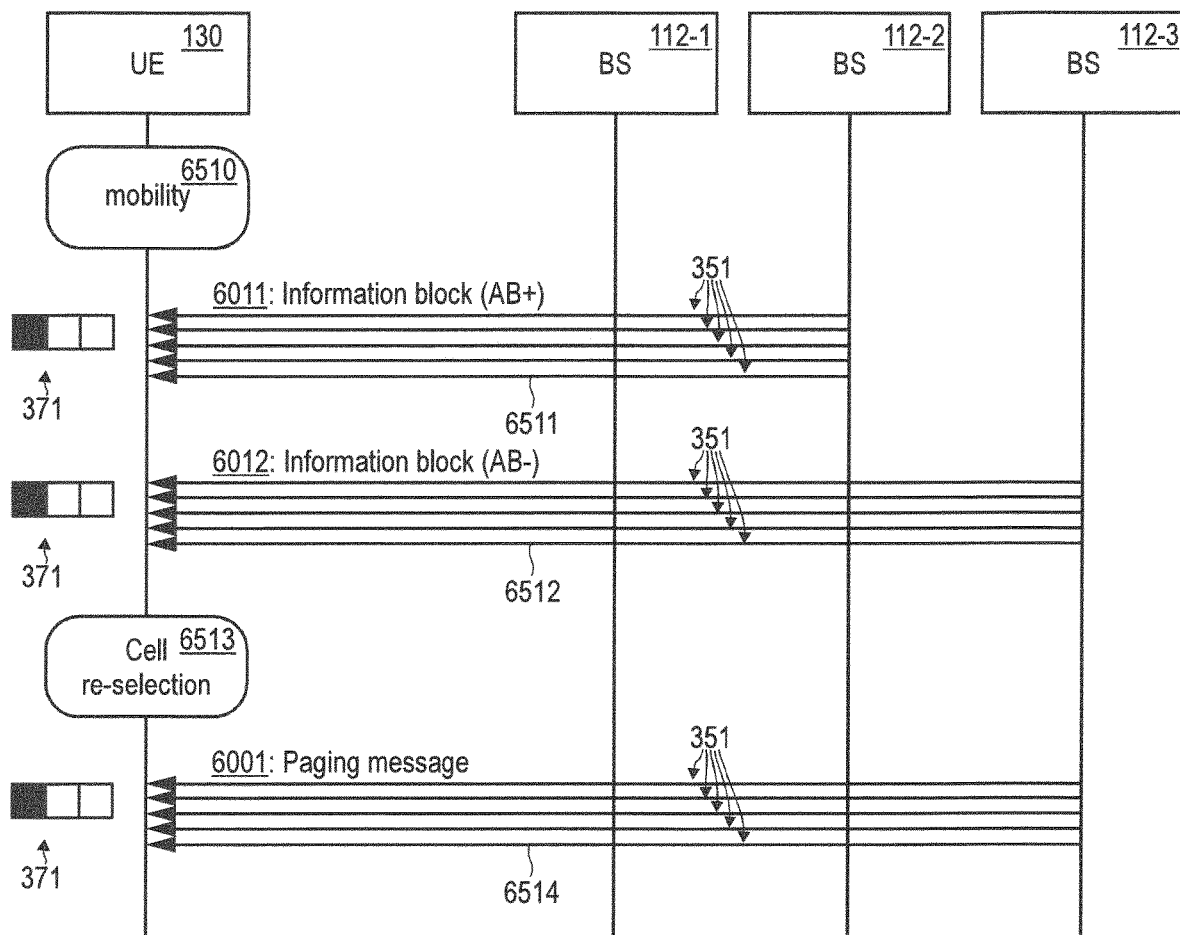
FIG. 9 schematically illustrates network paging of a UE and access restrictions according to various examples.

FIG. 9 illustrates aspects with respect to paging the UE 130. FIG. 9 is a signaling diagram of communication between the UE 130 and the various BSs 112-1-112-3. The BS 112-1-112-3 are part of a tracking area.

The UE is initially operated in idle mode 303. The UE camps on the BS 112-1; the BS 112-1 is associated with a source cell 181.

FIG. 9 furthermore illustrates aspects with respect to UE mobility. At 6510, UE mobility occurs. Hence, the UE 130 moves and the signal quality of communicating between the BS 112-1 of the source cell 181 and the UE 130 degrades. For example, such a degradation of the signal quality of the wireless link 101 between the BS 112-1 and the UE 130 could be quantified based on a receive property of a pilot tone transmitted by the BS 112-1 and evaluated by the UE 130.

Due to the UE mobility at 6510, the UE intends to select a target cell 182, 183. For this, the UE 130 receives multiple repetitions 351 of a DL control message 6011, 6511. The DL control message 6011 is an information block transmitted by the BS 112-2. The message 6011 is indicative of an access restriction employed by the BS 112-2. AB is employed by the BS 112-2 and access restrictions of the AB apply for the UE 130. The UE 130, therefore, does not select the cell 182 associated with the BS 112-2 as target cell.

The DL control message 6011 is broadcasted by the BS 112-2. Hence, various UEs can receive the DL control message 6011—even if a data connection is not established via the BS 112-2.

For example, a repetition rate of the repetitions 351 of the message 6011 may be in the range of 40 ms-100 ms; if hundreds or thousands of repetitions 351 are accumulated, then this costs time and energy—just to find out that access to the cell 182 is barred.

Rather, at 6512, the UE 130 receives multiple repetitions 351 of a DL control message 6012. The DL control message 6012 is an information block transmitted by the BS 112-3. Again, the DL control message 6012 is broadcasted by the BS 112-3.

The DL control message 6012 is indicative of the BS 112-3 not employing access restrictions. AB is not employed by the BS 112-3 and the UE 130, therefore, selects the cell 183 associated with the BS 112-3 as target cell, 6513. From then on, the UE 130 camps on the cell 183.

Eventually, the UE is being paged by the network; hence, the BS 112-3, at 6514, transmits multiple repetitions 351 of a paging message 6001, all encoded according to the same redundancy version 371. Again, a random access procedure and RRC setup of the data connection 160 may then follow (not illustrated in FIG. 9).

As will be appreciated from FIG. 9, the time duration between occurrence of the mobility at 6510 and the cell re-selection at 6513 is comparably long. In particular, this time duration is partly defined by the duration 352 required for the multiple repetitions 351 of the messages 6011, 6012. This significant length of the time duration between the mobility 6510 of the cell re-selection 6513 can negatively affect the connectivity. Therefore, hereinafter, techniques will be described which enable to mitigate such issues associated with a significant duration in a CE scenario when re-selecting a new cell.

Figure 10:
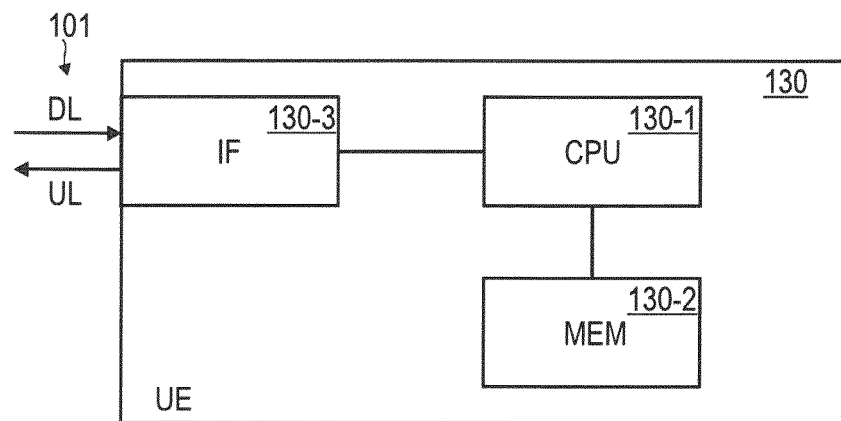
FIG. 10 schematically illustrates the UE according to various examples.

FIG. 10 schematically illustrates the UE 130. The UE 130 includes control circuitry implemented by a processor 130-1, e.g., a single core or multicore processor. Distributed processing may be employed. The processor 130-1 is coupled to a memory 130-2, e.g., a non-volatile memory. The memory 130-2 may store program code that is executable by the processor 130-1. Executing the program code may cause the processor 130-1 to perform techniques as disclosed herein, e.g., relating to: CE; UE mobility; cell re-selection; handovers; operating in idle mode; etc. Such functionality which is illustrated with respect to the processor 130-1 in the example of FIG. 10, in other examples may also be implemented using hardware. The UE 130 also includes an interface 130-3 configured to communicate with the BS 112 on the wireless link 101. The interface 130-3 may include an analog front end and/or a digital front end.

The interface 130-3 may implement a transmission protocol stack, e.g., according to the 3GPP LTE technology. The transmission protocol stack may include a physical layer (Layer 1), a MAC layer (Layer 2), etc.

Figure 11:
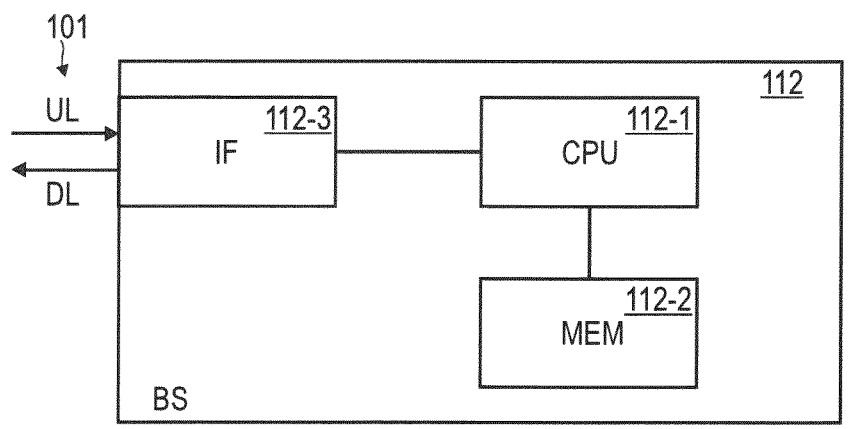
FIG. 11 schematically illustrates the BS according to various examples.

FIG. 11 schematically illustrates the BS 112. The BS 112 includes control circuitry implemented by a processor 112-1, e.g., a single core or multicore processor. Distributed processing may be employed. The processor 112-1 is coupled to a memory 112-2, e.g., a non-volatile memory. The memory 112-2 may store program code that is executable by the processor 112-1. Executing the program code can cause the processor 112-1 to perform techniques as disclosed herein, e.g., relating to: CE;

paging a UE; etc. Such techniques as illustrated with respect to FIG. 11 for the processor 112-1 and the memory 112-2 may also be implemented partly or fully in hardware in other examples. The BS 112 also includes an interface 112-3 configured to communicate with the UE 130 on the wireless link 101. The interface 112-3 may include an analog front end and/or a digital front end. The interface 112-3 may implement a transmission protocol stack, e.g., according to the 3GPP LTE technology. The transmission protocol stack may include a physical layer (Layer 1), a MAC layer (Layer 2), etc.

Figure 12:
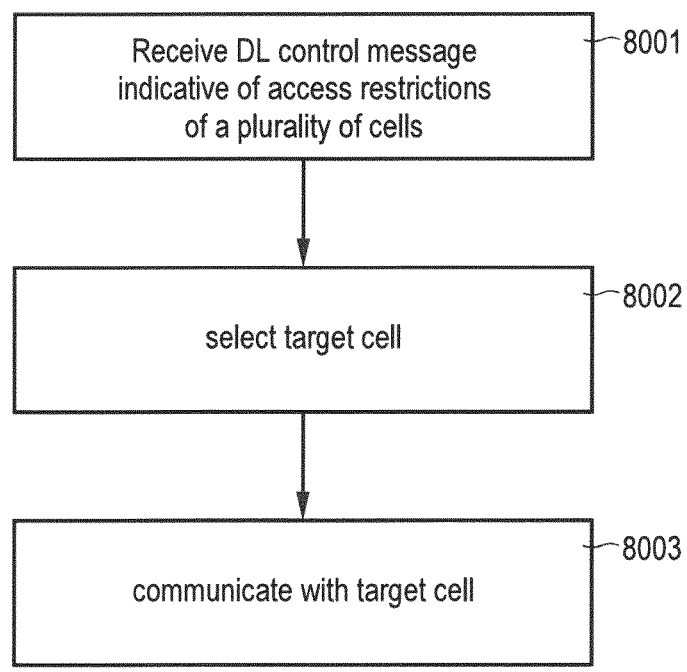
FIG. 12 is a flowchart of a method according to various examples.

FIG. 12 is a flowchart of a method according to various examples. The method according to FIG. 12 may be executed by the control circuitry 130-1 of the UE 130, e.g., in accordance with program code loaded from the memory 130-2.

At box 8001, a DL control message is received. For example, the DL control message may be implemented by an information block that is broadcasted by a BS of a network.

Hence, the DL control message may be received on a broadcast control channel, e.g., PBCH. For example, the DL control message may be a system information block broadcasted. It would also be possible that the DL control message is a dedicated message directed to the UE on a dedicated control channel or payload channel, e.g., one of the channels 263 or 263. For example, the DL control message may be a RRC control message. For example, the DL control message may be directed to the UE. For example, the DL control message may be communicated on the PDSCH or a comparable channel.

According to certain examples, it would be possible that multiple repetitions of the DL control message are received in accordance with the repetition level of a CE policy. Then, a combination of the signals associated with each repetition of the DL control message can be decoded. Similar techniques have been explained above in connection with FIGS. 3-5.

The DL control message is indicative of access restrictions of a plurality of candidate cells. For example, the DL control message may include a respective single bit or multi-bit indicator or control field.

Thus, while the DL control message is received from a source cell—sometimes also referred to as serving cell on which the UE camps—, the DL control message may be indicative of the access restrictions of a plurality of different candidate cells. It would be possible that the source cell and the various candidate cells are all associated with the same tracking area of the network 100. Alternatively or additionally, it would be possible that the source cell and the various candidate cells are nearest neighbors, i.e., arranged adjacent to each other or—e.g., in the scenario of macro and pico cells—included within each other. Hence, the DL control message may include information on whether certain cells in the vicinity of the UE employ access restrictions. Such information may be helpful when the UE re-selects the cell, e.g., due to UE mobility.

It is generally possible that the DL control message at 8001 is received in connected mode, i.e., while a data connection is set up between the UE and the network. Then, the information on the access restrictions of the plurality of candidate cells may be stored in a memory of the UE for later use. For example, the information on the access restrictions of the plurality of candidate cells may be stored in the memory when the UE transitions from the connected mode to idle mode, i.e., when the data connection is released. In other scenarios, it would also be possible that the DL control message is received at 8001 in idle mode. In particular, here it would be possible that the DL control message is broadcasted at 8001 as an information block of the source cell on which the UE camps.

At 8002, the UE has eventually transitioned into idle mode. Then, cell re-selection occurs. The cell re-selection takes into account the DL control message, i.e., the information regarding the access restrictions of the plurality of candidate cells indicated by the DL control message.

There are different strategies possible for taking into account the information regarding the access restrictions of the plurality of candidate cells selecting the target cell at 8002. For example, it would be possible to select, from the plurality of candidate cells, the target cell if the DL control message is indicative of no access restrictions or at least no access restrictions being relevant to the UE being implemented by the target cell. In further examples, it would also be possible to take into additional account the signal qualities of wireless links between the UE and the various candidate cells; then, if access restrictions which regulate the repetition levels of CE policies are employed by the various candidate cells, adjustment of the repetition levels can be made in order to optimize, both, the signal quality and the repetition level. In a further strategy, the UE may preferably select such cells which enable to communicate using low repetition levels; for example, it could be preferable to select the target cell which offers to communicate without any repetitions or only a few repetitions.

For example, any adjustment of the repetition level of the CE policies may apply to connected mode. For example, one the UE transitions from idle mode to connected mode, the CE policy may be negotiated with the target cell. Here, certain repetition levels may be restricted; while other repetition levels may be acceptable. Then, based on the information regarding the access restrictions, it can be anticipated whether—once transitioned to connected mode—the preferred repetition level is available and not restricted.

At 8003, communication with the target cell is implemented. This may correspond to the UE 130 camping on the target cell. Hence, the UE 130 may listen for paging messages transmitted by a BS of the target cell. The UE 130 may receive a paging message transmitted by the BS of the target cell, e.g., may receive multiple repetitions of the paging message or—if the repetition level is 1—may receive a single repetition of the paging message.

FIG. 13 is a flowchart of a method according to various examples. For example, the method according to FIG. 13 could be executed by the control circuitry 112-1 of the BS 112, e.g., based on program code that is loaded from the memory 112-2.

At box 8011, a DL control message which is indicative of access restrictions of a plurality of candidate cells is transmitted to a UE. Box 8011 is inter-related with box 8001.

For example, it may be possible that the plurality of candidate cells are selected from cells of a network based on various decision criteria. For example, the candidate cells may be selected based on one or more tracking areas of the network with which the cells are associated. Alternatively or additionally, the candidate cells could be selected based on a spatial arrangement of the various cells. For example, the candidate cells could be selected based on a distance or neighborhood relationship with the cell on which the UE is currently camping on. This helps to limit the overhead associated with communicating the DL control message by restricting the information included therein to the necessary candidate cells.

Figure 14:
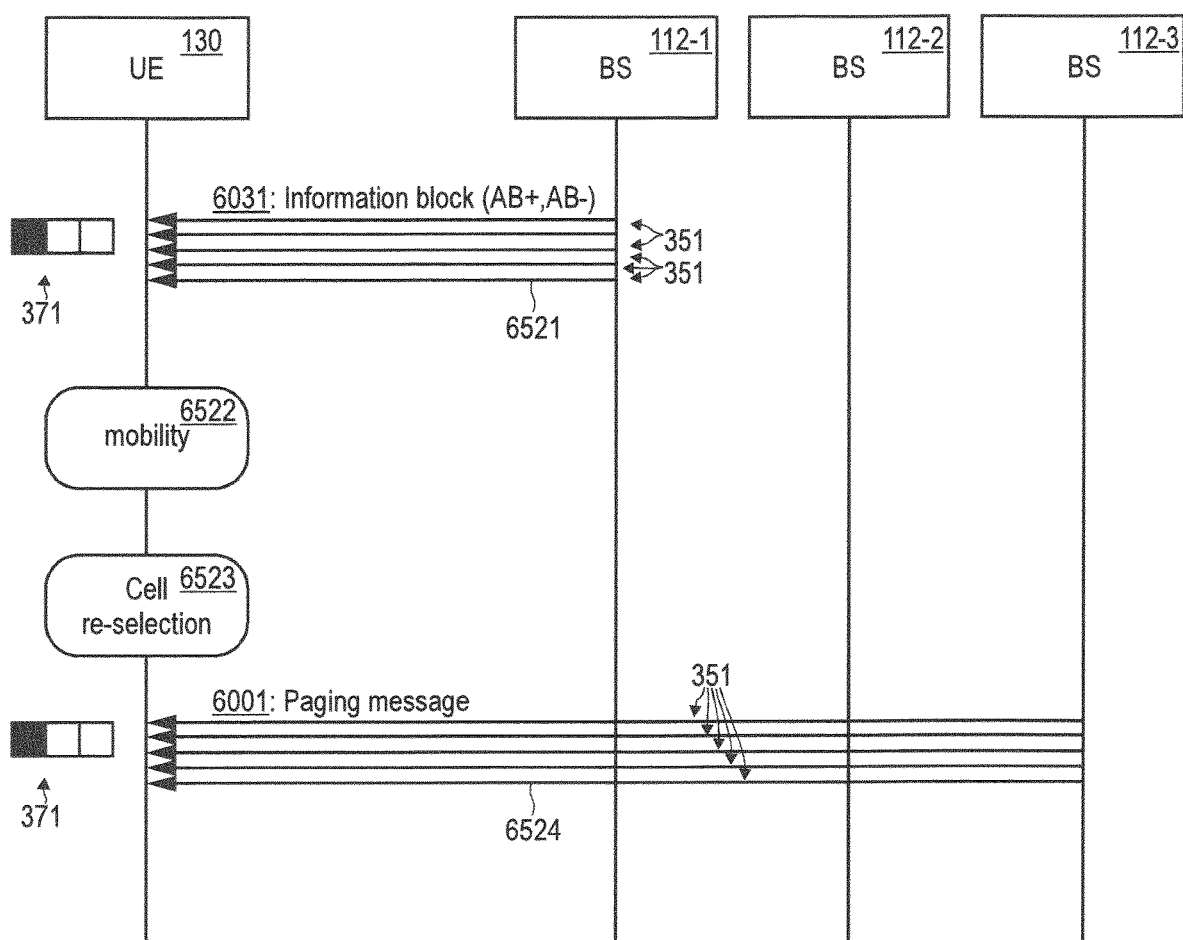
FIG. 14 schematically illustrates network paging of a UE and access restrictions according to various examples.

FIG. 14 is a signaling diagram. FIG. 14 illustrates aspects with respect to communication between the UE 130 and the BSs 112-1-112-3. The scenario of FIG. 14 generally corresponds to the scenario of FIG. 9. The UE 130 initially camps on the cell 181 associated with the BS 112-1. The UE 130 is initially in idle mode.

At 6521, the BS 112-1 transmits multiple repetitions of a control message 6031. The control message may be implemented as a broadcasted information block, e.g., on PBCH as part of a system information block. Alternatively, it would also be possible that the control message 6031 is dedicated to the UE 130, i.e., not broadcasted. Here, a RRC control message may be used.

The control message 6031 is indicative of access restrictions of the cells 182, 183 associated with the BSs 112-2, 112-3. Hence, the UE 130 is informed on any access restrictions of the cells 182, 183 in the vicinity of the source cell 181 associated with the BS 112-1 on which the UE 130 camps at 6521.

Then, at 6522 while the UE 130 is in idle mode 303, mobility of the UE 130 occurs. This may be determined by monitoring a signal quality of the wireless link 101 between the UE 130 and the source cell 181 associated with the BS 112-1 and/or by monitoring a signal quality of the wireless link between the UE 130 and the target cell 183 associated with the BS 112-3 or other candidate cells 182, 183. For example, if the signal quality of the wireless link 101 between the UE 130 and the source cell 181 drops below a threshold and/or if the signal quality of the wireless link between the UE 130 and one of the candidate cells 182, 183 exceeds a threshold, mobility may be determined to occur. Such a scenario may correspond to the UE 130 reaching a cell edge of the source cell 181.

At this point, the UE 130 already has all information regarding access restrictions of the neighboring candidate cells 112-2, 112-3 available; hence, the UE does not need to listen for information blocks transmitted by the BSs 112-2, 112-3 of any candidate cell 182, 183 for obtaining information on potential access restrictions and before performing the cell re-selection at 6523. The cell re-selection is thus based on the control message 6031. For example, already from the control message 6031, the UE 130 is aware that access restrictions apply for the BS 112-2, but not for the BS 112-3. Therefore, the UE 130 selects the cell 183 associated with the BS 112-3 as the target cell and starts camping on the target cell 183. Thus, at 6524, the UE 130 receives multiple repetitions 351 of the paging message 6001 from the BS 112-3 associated with the target cell 183.

From a comparison between FIGS. 9 and 14 it follows that by communicating the control message 6031 between the BS 112-1 of the source cell 181 and the UE 130 prior to the mobility occurring at 6522, the time duration between the occurrence of the mobility 6522 and the cell re-selection at 6523 can be reduced. This facilitates reliable connectivity of the UE 130.

While in the scenario of FIG. 14 the DL control message 6521 is broadcasted while the UE is operated in idle mode 603, in other examples it would also be possible that the DL control message 6521 is transmitted while the UE is operated in connected mode 601, 602, e.g., using dedicated time-frequency resources of a UE-specific control channel 262.

In the various examples described herein, the information content of the control message 6031 may vary. A larger or smaller information depth may be provided with the control message 6031. This is explained with respect to FIGS. 15-17.

Figure 15:
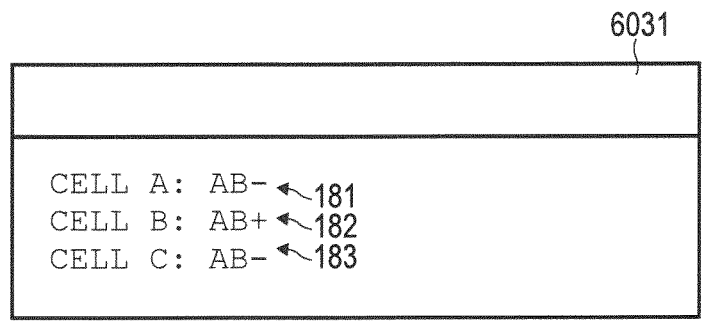
FIG. 15 schematically illustrates a control message indicative of access restrictions of a plurality of cells according to various examples.

FIG. 15 illustrates aspects with respect to the control message 6031. In the example of FIG. 15, the control message 6031 is indicative of whether any access restrictions apply or not apply for three different cells 181-183 (for example "AB-" may indicate that access restrictions do not apply; while "AB+" may indicate that access restrictions apply). For example, these access restrictions may be implemented according to 3GPP TS 22.011 version 15.0.0 (2017-03), section 4 "Access Control". Such an access restriction is not tied to a particular repetition level of any CE policy that may be employed.

The control message 6031 includes indicators indicative of cell identities of the various candidate cells. For example, these may be unique indicators which are assigned to individual cells of the network 100. These indicators indicative of the cell identities are then associated with respective indicators which indicate whether these access restrictions apply. Providing the cell identities facilitates matching the information on access restrictions with signal quality measurements performed for wireless links between the UE and the various candidate cells in the cell re-selection process.

Figure 16:
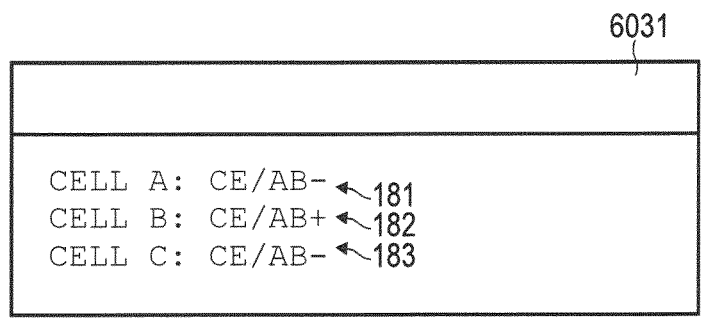
FIG. 16 schematically illustrates a control message indicative of access restrictions of a plurality of cells according to various examples.

FIG. 16 illustrates aspects with respect to an example implementation of the control message 6031. In the example of FIG. 16, the control message 6031 is indicative, for each one of the cells 181-183, whether any regulated repetition levels according to the respective CE policy result in access restrictions. In other words, in the scenario of FIG. 16, the control message 6031 is indicative of the existence of at least one respective regulated repetition level. This facilitates implementation of CE-related AB.

Thus, the UE 130 is informed that access restrictions associated with one or more regulated repetition levels apply for certain cells. The control message 6031 according to the example of FIG. 16 does not explicitly specify the various regulated repetition levels; such additional information may be obtained by the UE directly from the respective candidate cell, if required.

In the scenario FIG. 16, thus, the control message 6031 includes, for each candidate cell 182-183, a 1-bit indicator which is indicative of whether any regulated repetition levels apply for the respective candidate cell 182-183. Thus, in FIG. 16, the information depth of the control message 6031 is limited to a high-level granularity. This limits the overhead associated with communication of the control message 6031.

Instead of a 1-bit indicator, it would also be possible to include multi-bit indicators to, thereby, already include more detailed information on the regulator repetition levels of the respective candidate cell 181-183. This is illustrated in connection with FIG. 17.

Figure 17:
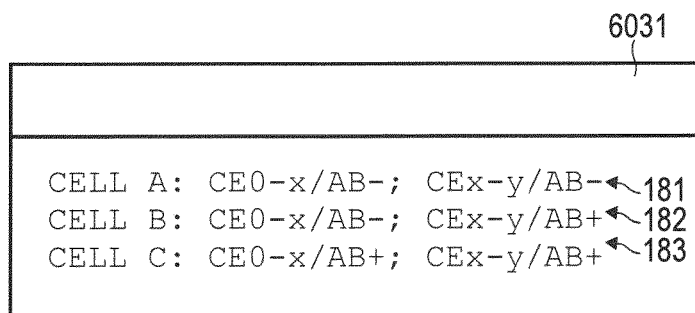
FIG. 17 schematically illustrates a control message indicative of access restrictions of a plurality of cells according to various examples.

FIG. 17 illustrates aspects with respect to an example implementation of the control message 6031. In the example of FIG. 17, the control message 6031 is indicative, for each one of the cells 181-183, whether access restrictions apply or not apply for regulated repetition levels according to the respective CE policy. In other words, also in the scenario FIG. 17, the control message 6031 is indicative of at least one regulated repetition level, but additionally explicitly specifies the regulated repetition level and the associated access restriction.

The control message 6031 according to the example of FIG. 17 explicitly specifies the various regulated repetition levels: for example, a first regulated repetition level is defined between 0 and x repetitions; while a second regulated repetition level is defined between x repetitions and y repetitions. As illustrated in FIG. 17, access may be restricted to some of the regulated repetition levels, on a per-cell basis.

Hence, in the scenario of FIG. 17, the control message 6031 includes, for each candidate cell 181-183, a multi-bit indicator which is indicative of a plurality of different regulated repetition levels of the respective candidate cell 181-183. This helps to provide a large information depth to the UE prior to cell re-selection and thus facilitates the UE mobility at low latency.

Figure 18:
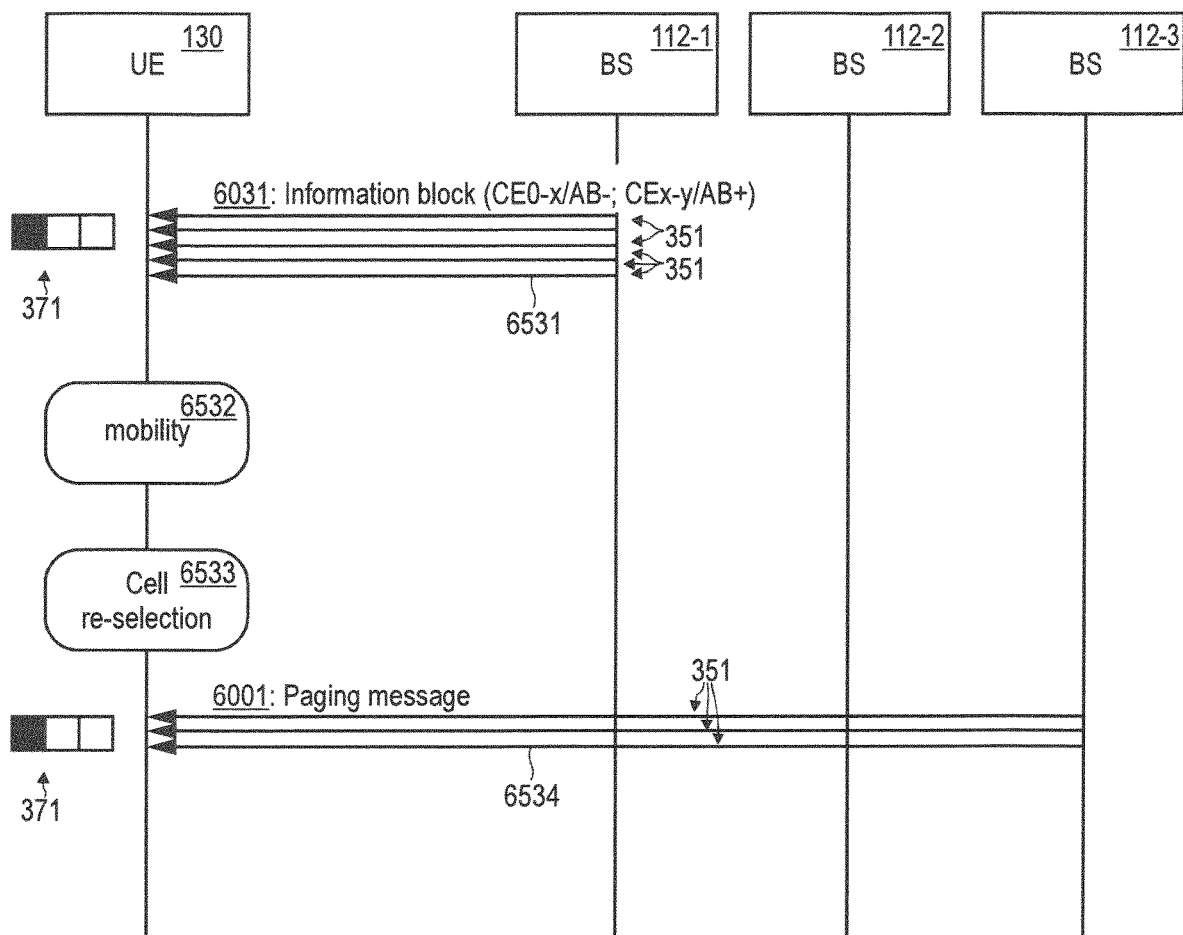
FIG. 18 schematically illustrates network paging of a UE and access restrictions according to various examples.

FIG. 18 is a signaling diagram. FIG. 18 illustrates aspects with respect to communication between the UE 130 and the BSs 112-1-112-3. In particular, the scenario of FIG. 18 generally corresponds to the scenario of FIG. 14.

6531 corresponds to 6521.6532 corresponds to 6522.6533 corresponds to 6523.

6534 corresponds to 6524. However, in the example according to FIG. 18, the repetition level of the CE policy is adjusted in response to re-selection of the cell at 6533. This is due because the control message 6031 received by the UE 130 is indicative of regulated repetition levels including restricted repetition levels and non-restricted repetition levels. A non-restricted repetition level is then used for reception of the paging message 6001 at 6534. The information depth of the control message 6031 in the example of FIG. 18 is comparably high.

In other examples, any restricted repetition levels may only apply to connected mode. Here, when transitioning into connected mode 301 in response to receiving the paging message 6001, a repetition level may be negotiated between the UE 130 and the BS 112-3 of the target cell 183 which meets the access restrictions. If the target cell 183 is pro-actively selected in idle mode 303 in awareness of the regulated repetition levels of connected mode 301, then delays or connectivity problems when setting up the data connection 160 can be avoided.

For example, the repetition level used for communicating with the BS 112-3 may be determined based on, both, a signal quality of the wireless link between the UE 130 and the BS 112-3 associated with the target cell 183, as well as further based by taking into account the regulated repetition levels indicated by the control message 6031.

Thereby, the repetition level can be flexibly tailored based on, both, the access restrictions that may apply, as well as the signal quality encountered. This reduces the network load.

For example, it would be possible to compare the repetition level employed for communicating between the BS 112-1 associated with the source cell 181 and the UE 130 with the regulated repetition levels of the various candidate cells 182, 183. Then, the target cell 183 may be selected based on said comparing of the repetition level.

For example, said comparing yields one of the candidate cells supports maintaining the previous repetition level, then this candidate cell may be selected as the target cell.

Figure 19:
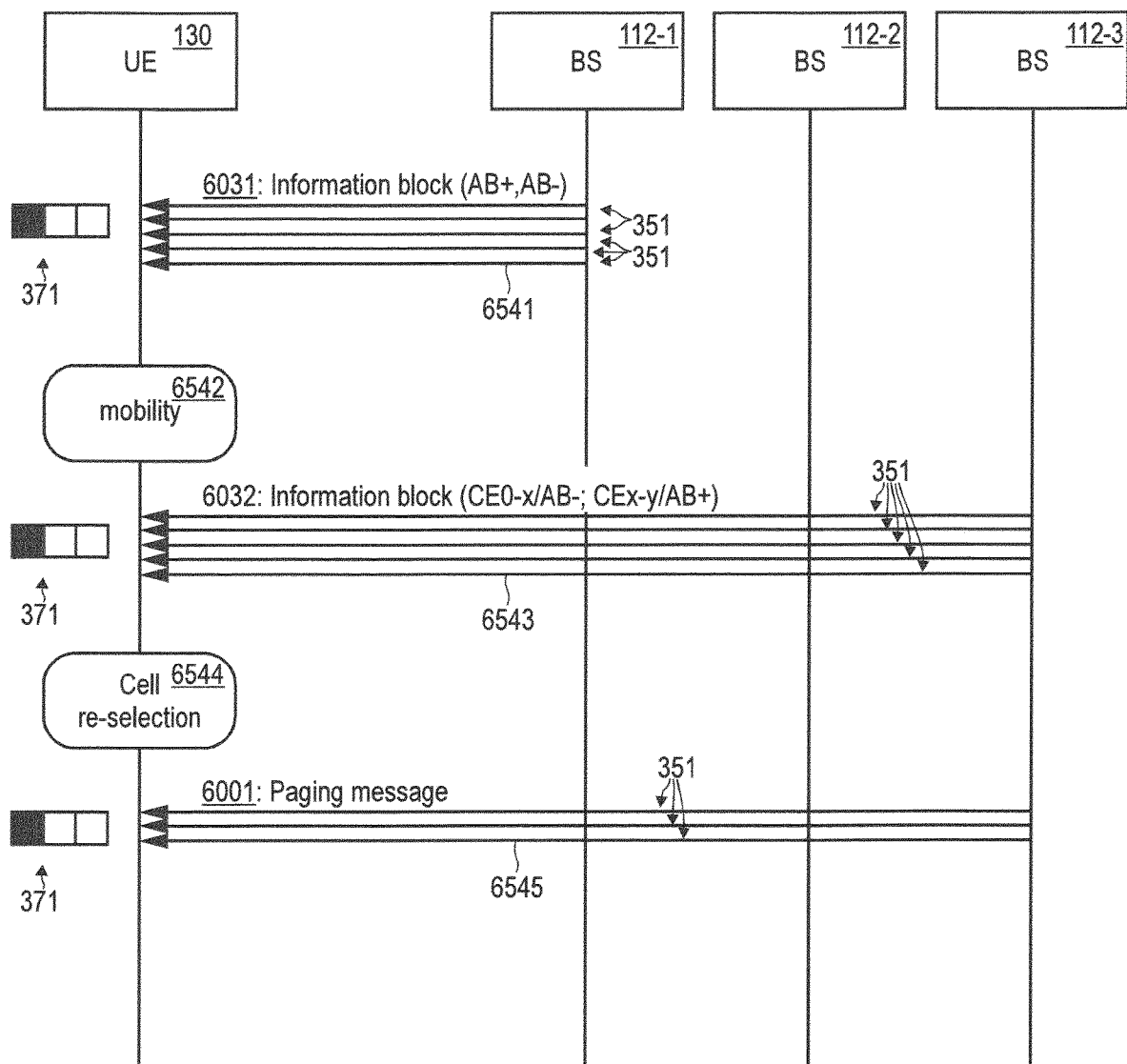
FIG. 19 schematically illustrates network paging of a UE and access restrictions according to various examples.

FIG. 19 is a signaling diagram. FIG. 19 a illustrates aspects with respect to communication between the UE 130 and the BSs 112-1-112-3. In particular, the scenario of FIG. 19 generally corresponds to the scenario of FIG. 14.

6541 corresponds to 6521.6542 corresponds to 6522.

Then, at 6543, a DL control message 6032 is transmitted by the BS 112-3 and received by the UE 130. The DL control message 6032 is explicitly indicative of the various regulated repetition levels employed by the access restrictions of the BS 112-3. The control message 6032 is indicative of the access restrictions of the cell 183 associated with the BS 112-3 at a larger information depth or enhanced granularity if compared to the control message 6031. By shifting at least some of the information from the DL control message 6031 to the DL control message 6032, the size of the DL control message 6031 can be reduced. A trade-off between overhead and latency when re-selecting the cell can be achieved.

In detail, as illustrated in FIG. 18, multiple repetitions 351 of the DL control message 6032 are communicated. This is in accordance with the repetition level of the respective CE policy. For example, a repetition rate of the multiple repetitions 351 of the DL control message 6032 could be longer than 50 milliseconds, optionally longer than 100 milliseconds, further optionally longer than 200 milliseconds. As will be appreciated from these numbers, in combination with comparably large repetition levels—e.g., in the order of 100 or 1000 repetitions—, significant delays are observed. Therefore, by already obtaining some information on the access restrictions by means of the control message 6031, it is possible to reduce the likelihood of unsuccessful or unnecessary communication between a large number of BSs and the UE 130.

6544 corresponds to 6523.6545 corresponds to 6524; again, in the example according to FIG. 19, the repetition level of the CE policies adjusted in response to re-selection of the cell at 6544. This is because the control message 6032 is indicative of regulated repetition levels included restricted repetition levels in non-restricted repetition levels.

A non-restricted repetition level is then used. Such an adjustment of the repetition level is generally optional.

Figure 20:
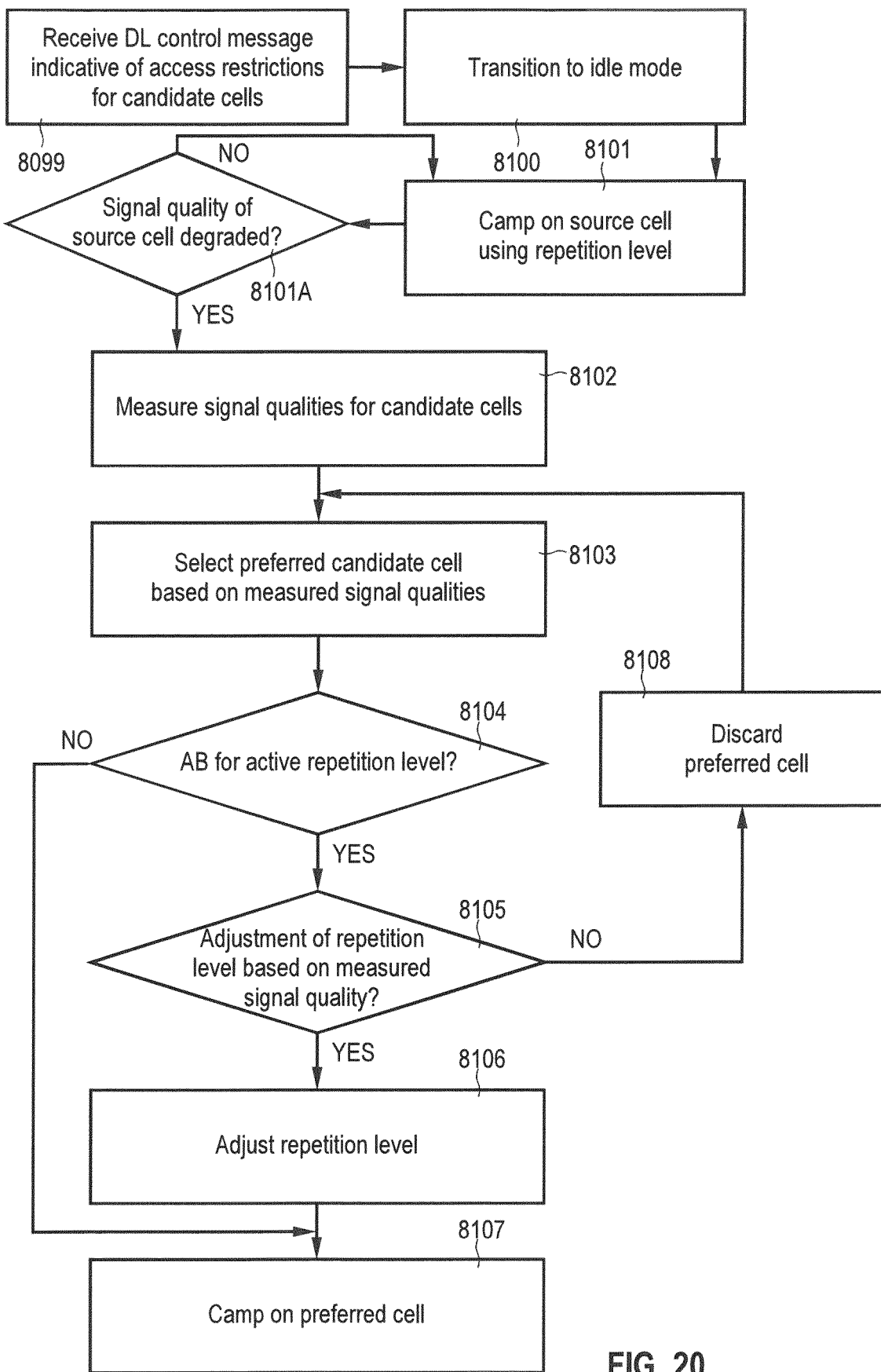
FIG. 20 is a flowchart of a method according to various examples.

FIG. 20 is a flowchart of a method according to various examples. For example, the method according to FIG. 20 may be executed by the control circuitry 130-1 of the UE 130.

First, at box 8099, a DL control message is received which is indicative of access restrictions for candidate cells. For example, the control message may include—for each candidate cell—a 1-bit indicator or a multi-bit indicator; these indicators may be associated with the cell identities of the respective candidate cell. If the 1-bit indicator is used, it may be indicated whether any access restrictions—e.g., for any repetition level—applies. If, however, the multi-bit indicator is used, it may be indicated for multiple regulated repetition levels whether any access restrictions apply or not (cf. FIGS. 16 and 17).

The DL control message and/or the respective one or more indicators indicative of the access restrictions may be stored. This storing may facilitate later retrieval of the DL control message and/or the one or more indicators, e.g., when required due to cell re-selection.

For example, the DL control message may be received based on the data connection 160 that is set-up in connected mode 301. For example, the DL control message may be a RRC DL control message that is directed to the UE.

While in FIG. 20 a scenario is illustrated where the DL control message is received in connected mode, in other scenarios the DL control message may also be received in idle mode. For example, here, the DL control message may be broadcasted, e.g., using an information block on PBCH.

At box 8100, a transition into operation of the UE idle mode is made (assuming that the DL control message was received in connected mode). A DRX cycle may be employed. The UE may repetitively listen for DL paging messages. In particular, at box 8101, the UE camps on the source cell using a certain repetition level of a CE policy. The reception of paging messages is implemented using this repetition level.

In some examples, it would be possible to, first, transition into idle mode and, second, receive the DL control message; i.e., it is possible to, first, execute box 8100 and, second execute box 8099. In such case the UE may receive the DL control message as a broadcasted control message.

At box 8101A, it is checked whether the signal quality of the source cell is degraded, e.g., below a certain threshold. If this is the case, a cell re-selection procedure is triggered by executing box 8102.

At box 8102, the signal quality is of the wireless links between the UE and at least some of the candidate cells are measured, e.g., using pilot tones or broadcasted system information from candidate cells. At this point, a match between cell identities included in the message received at box 8099 and cell identities associated with the respective pilot tones may be employed.

Optionally, based on a comparison between the signal quality of the wireless link between the UE and the source cell on the one hand side, and the signal qualities of the wireless links between the UE and the various candidate cells, a pre-selection of appropriate candidate cells may be made. For example, all such candidate cells may be discarded which would correspond to a worsening of the signal quality if compared to a signal quality of the wireless link between the UE and the source cell.

Next, at box 8103, a preferred candidate cell is selected based on the measured signal qualities. Already discarded candidate cells are not taken into account. For example, the preferred candidate cell could be the particular candidate cell which offers the highest signal quality. This corresponds to a ranking of the available candidate cells depending on the measured signal qualities.

Then, at box 8104 it can be checked whether AB applies for the active repetition level at the selected preferred candidate cell. This check at box 8104 can be made based on the DL control message received at box 8099. Optionally, a further DL control message received directly from the selected preferred candidate cell may be taken into account. The AB may apply to connected mode 301.

If at box 8104 it is judged that no access restrictions apply for the active repetition level of the CE policy currently employed by the UE, then, cell re-selection may be triggered and at box 8107, the UE may subsequently camp on the current active preferred cell—which is, thus, the target cell.

In some examples, at box 8104 limited access may be implemented. Here, a candidate cell may be selected as target cell even when operating the UE in idle mode—even if access restrictions apply for that target cell for connected mode.

If, however, at box 8104 it is judged that access restrictions apply for the active repetition level, then, at box 8105 it can be checked whether an adjustment of the repetition level is possible; e.g., this judgment can be made based on the measured signal quality for the preferred candidate cell and/or a further DL control message received directly from the selected preferred candidate cell including a larger information depth. If, e.g., a comparison of the measured signal quality for the selected preferred candidate cell and the signal quality for the source cell yields that an improvement in the signal quality is possible, then, the repetition level may be reduced. Accordingly, if such an adjustment is possible, then, it is executed in box 8106; subsequently, the UE camps on the preferred cell using the adjusted repetition level.

If at box 8105 it is judged that an adjustment of the repetition level is not possible in accordance with the regulated repetition levels for which access restrictions exist, then, the currently selected preferred cell is discarded at box 8108 and a selection of the next preferred candidate cell is executed at box 8103.

Summarizing, above techniques have been described which enable efficient UE mobility. If a UE camps on a source cell, it can receive information about neighboring cells. In particular, the UE can receive information on access restrictions of the neighboring cells. This information may be provided as part of the system information block of the source cell or be a dedicated signaling. The dedicated signaling could be, e.g., RRC control signaling. Thereby, the UE is able to receive the information on access restrictions for multiple cells via one modem activity period, e.g., by reading the full system information block of the source cell or by dedicated control signaling while operating in connected mode in the source cell.

If UE mobility occurs—or, generally, for any other reason—at some point a cell re-selection procedure may be triggered. For example, based on monitored signal qualities, the UE may determine that one or more of the neighboring cells can be better candidates for camping on. In such a scenario, based on the previously obtained information about neighboring cells, the UE already has knowledge about whether access restrictions apply at these neighboring cells or not.

In scenarios where CE is employed, multiple repetitions would otherwise be required to receive this information from the candidate cells; then, the time duration saved is significant, because it is not required to receive the multiple repetitions from the respective candidate cells. For example, if such information was only to be received via the information blocks from the candidate cells, then a significant number of repetitions at a potentially low repetition rate would have to be received from each candidate cell before it similar information would be available in conventional approaches. Rather, by means of the techniques described herein, the UE is able to quickly determine whether a candidate cell employs AB—e.g., for access with a certain repetition level of the CE policy—or whether the candidate cell does not employ AB. In particular, once the UE has obtained the cell identity of a candidate cell from broadcasted transmissions of that candidate cell, it may be able to match that cell identity with cell identities included in a control message previously received from the source cell. Here, these cell identities may be associated with the respective AB of the various candidate cells. Thereby, the modem activity required for seller re-selection can be reduced.

Summarizing, a cell re-selecting optimization is described with the UE may store AB information for multiple cells. The AB information for one or more neighbor cells may be transmitted to the UE via system information or via RRC signaling. Once the UE conducts a cell re-selection procedure, a new cell will be identified and it's cell ID and stored AB parameters may be used. In order to select a new cell, the cell re-selection may be executed in case the signal quality is better than a determined threshold and if the new cell is not barred with the estimated repetition level according to the stored barring information. Such techniques may be employed in various kinds and types of devices such as MTC or IOT devices.

Further embodiments of the invention may be described in the following numbered examples.

1. Example: A method of operating a communication device (130), comprising:
   receiving at least one downlink control message (6031) from a base station (112, 112-1) of a source cell (181) of a network (100), the at least one downlink control message (6031) being indicative of access restrictions of a plurality of candidate cells (182, 183) of the network (100),
   based on the at least one downlink control message (6031): selecting a target cell (182, 183) from the plurality of candidate cells (182, 183), and
   communicating between the communication device (130) and a base station (112, 112-2, 112-3) of the target cell (182, 183).

2. Example: The method of numbered example 1,
wherein the at least one downlink control message (6031) is indicative, for each candidate cell (182, 183) of the plurality of candidate cells (182, 183), of at least one respective regulated repetition level.

3. Example: The method of example 2, further comprising:
based on a signal quality of a wireless link between the UE and the base station (112, 112-2, 112-3) of the target cell (182, 183) and further based on the regulated repetition level of the target cell (182, 183): determining a repetition level of a coverage enhancement policy employed for said communicating between the communication device (130) and the base station (112, 112-2, 112-3) of the target cell (182, 183).

4. Example: The method of examples 2 or 3, further comprising:
comparing a repetition level of a coverage enhancement policy employed for communicating between the communication device (130) and the base station (112, 112-1) of the source cell (181) and the regulated repetition levels of the plurality of candidate cells (182, 183),
wherein the target cell (182, 183) is selected based on said comparing of the repetition level.

5. Example: The method of any one of the preceding numbered examples, further comprising:
comparing a signal quality of a wireless link (101) between the source cell (181) and the communication device (130) and a signal quality of further wireless links between base stations of the plurality of candidate cells (182, 183) and the communication device (130), wherein the target cell (182, 183) is selected based on said comparing of the
signal qualities.

6. Example: The method of any one of numbered examples 2-5,
wherein the at least one downlink control message (6031) comprises, for each candidate cell (182, 183) of the plurality of candidate cells (182, 183), a 1-bit indicator which is indicative of whether any regulated repetition levels apply for the respective candidate cell (182, 183).

7. Example: The method of any one of numbered examples 2-6,
wherein the at least one downlink control message (6031) comprises, for each candidate cell (182, 183) of the plurality of candidate cells (182, 183), a multi-bit indicator which is indicative of a plurality of different regulated repetition levels of the respective candidate cell (182, 183).

8. Example: The method of any one of the preceding numbered examples, further comprising:
receiving, from the base station (112, 112-2, 112-3) of the target cell (182, 183), a further downlink control message (6011, 6012, 6032) which is indicative of a plurality of regulated repetition levels of the target cell (182, 183), and optionally
based on the plurality of regulated repetition levels of the target cell (182, 183): determining a repetition level of a coverage enhancement policy associated with said communicating between the communication device (130) and the base station (112, 112-2, 112-3) of the target cell (182, 183).

9. Example: The method of any one of the preceding numbered examples, further comprising:
based on the at least one downlink control message (6031): performing cell re-selection of the communication device (130) from the source cell (181) to the target cell (182, 183) while the communication device (130) is in idle mode (303).

10. Example: The method of example 9, further comprising:
monitoring at least one of a signal quality of a wireless link (101) between the base station (112, 112-1) of the source cell (181) and the communication device (130), and a signal quality of a further wireless link between the base station (112, 112-2, 112-3) of the target cell (182, 183) and the communication device (130), wherein the cell re-selection is selectively triggered depending on said monitoring.

11. Example: The method of any one of the preceding numbered examples,
wherein the at least one downlink control message (6031) is received on a broadcast channel.

12. Example: The method of any one of the preceding numbered examples,
wherein the plurality of candidate cells (182, 183) are at least one of spatially nearest neighbors of the source cell (181) and included in the same tracking area of the network (100) as the source cell (181).

13. Example: The method of any one of the preceding numbered examples,
wherein the at least one downlink control message (6031) comprises indicators indicative of the cell identities of the plurality candidate cells (182, 183).

14. Example: The method of any one of the preceding numbered examples,
wherein said communicating between the communication device (130) and the base station (112, 112-2, 112-3) of the target cell (182, 183) comprises:
receiving at least one repetition of a paging message from the base station (112, 112-2, 112-3) of the target cell (182, 183).

15. Example: The method of any one of the preceding numbered examples,
wherein said communicating between the communication device (130) and the base station (112, 112-2, 112-3) of the target cell (182, 183) comprises:
camping on the target cell (182, 183) in idle mode (303), wherein optionally the access restrictions apply to connected mode (301).

16. Example: The method of any one of the preceding numbered examples,
wherein the target cell (182, 183) is selected in accordance with the respective access restriction.

17. Example: A method, comprising:
transmitting at least one downlink control message (6031) from a base station (112, 112-1) of a source cell (181) of a network (100) to a communication device (130), the at least one downlink control message (6031) being indicative of access restrictions of a plurality of candidate cells (182, 183) of the network (100).

18. Example: The method of example 17, further comprising:
selecting the plurality of candidate cells (182, 183) of the network (100) from a plurality of cells (181, 182, 183) of the network (100) based on at least one of a spatial arrangement of the source cell (181) with respect to the cells of the plurality of cells and a tracking area of the source cell (181).

19. Example: A communication device (130) comprising control circuitry (130-1, 130-2) configured to perform:

receiving at least one downlink control message (6031) from a base station (112, 112-1) of a source cell (181) of a network (100), the at least one downlink control message (6031) being indicative of access restrictions of a plurality of candidate cells (182, 183) of the network (100), based on the at least one downlink control message (6031): selecting a target cell (182, 183) from the plurality of candidate cells (182, 183), and communicating between the communication device (130) and a base station (112, 112-2, 112-3) of the target cell (182, 183).

20. Example: A base station (112) comprising control circuitry (130-1, 130-2) configured to perform:

transmitting at least one downlink control message (6031) from a base station (112, 112-1) of a source cell (181) of a network (100) to a communication device (130), the at least one downlink control message (6031) being indicative of access restrictions of a plurality of candidate cells (182, 183) of the network (100).

21. Example: A system, comprising:
the base station of numbered example 20, and
the communication device (130) of numbered example 19.

22. Example: A method of operating a communication device (130), comprising:

receiving at least one downlink control message (6031) from a base station (112, 112-1) of a source cell (181) of a network (100), the at least one downlink control message (6031) being indicative of access restrictions of a plurality of candidate cells (182, 183) of the network (100), based on the at least one downlink control message (6031): selecting a target cell (182, 183) from the plurality of candidate cells (182, 183), and camping on the target cell (182, 183).

23. Example: A method of operating a communication device (130), comprising:

in connected mode (301): receiving at least one downlink control message (6031) from a base station (1112, 112-1) of a source cell (181) of a network, the at least one downlink control message (6031) being indicative of access restrictions of at least one candidate cell (182, 183) of the network (100) which is different from the source cell (181).

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, above various scenarios have been explained where DL control messages such as a paging message are communicated using multiple repetitions according to a CE policy. However, in some scenarios, it would be possible that multiple repetitions according to a CE policy only applied to uplink control messages.

For further illustration, above various scenarios have been explained where access restrictions for cells of a network apply, wherein the cells are defined by BS. Similar techniques may also be applied for access restrictions of relays. Here, a control message may be received from a BS or relay which is indicative of access restrictions of a plurality of relays.

For still further illustration, various examples have been described with respect to DL control messages which are indicative of access restrictions of a plurality of cells. Such a DL control message may be communicated via a relay. Also, sidelink communication would be possible.

For still further illustration, various examples have been described where cell re-selection is triggered due to UE mobility. However, in other examples there may be other reasons for cell re-selection, e.g., a cell becoming unavailable or changing its access restrictions.

For still further illustration, above various examples have been described where cell re-selection in idle mode is implemented based on a downlink control message which is indicative of access restrictions of a plurality of candidate cells. Such techniques may also be implemented in connection with handovers of UEs form a source cell to a target cell in connected mode. For example, such techniques may be helpful in connection with blind handovers.

For still further illustration, various scenarios have been described where the DL control message indicative of access restrictions is communicated in connected mode or idle mode: Such scenarios may be readily applied to idle mode and connected mode, respectively.

For still further illustration, above, various examples have been described where a DL control message is indicative of access restrictions of a plurality of candidate cells. Likewise, it would be possible that—per candidate cell—a single DL control message is indicative of an access restriction of that respective candidate cell. This may, in particular, apply when communicating the one or more DL control messages on a control channel in connected mode.

The invention claimed is:

1. A method of operating a communication device, comprising:

receiving at least one downlink control message from a base station of a source cell of a network, the at least one downlink control message being indicative of access restrictions of a plurality of candidate cells of the network, based on the at least one downlink control message:
selecting a target cell from the plurality of candidate cells, and
communicating between the communication device and a base station of the selected target cell, and wherein the at least one downlink control message is indicative, for the plurality of candidate cells of the network, of at least one regulated repetition level.

2. The method of claim 1, wherein a coverage-enhancement-related access barring is implemented based on the at least one regulated repetition level.

3. The method of claim 2, further comprising:
checking whether the access barring applies for an active repetition level at the selected target cell.

4. The method of claim 3, wherein the active repetition level to be used for communication with the selected target cell is determined based on a signal quality between the communication device and the selected target cell.

5. The method of claim 3, further comprising:
based on the applying of the access barring, selectively checking whether an adjustment of the active repetition level is possible.

6. The method of claim 1,
wherein said communicating between the communication device and the base station of the target cell comprises:
camping on the target cell in idle mode,
wherein optionally the access restrictions apply to connected mode.

7. The method of claim 1, further comprising:
based on the at least one downlink control message:

performing cell re-selection of the communication device from the source cell to the target cell while the communication device is in idle mode.

8. The method of claim 7, further comprising:
monitoring at least one of a signal quality of a wireless link between the base station of the source cell and the communication device, and a signal quality of a further wireless link between the base station of the target cell and the communication device,
wherein the cell re-selection is selectively triggered depending on said monitoring.

9. The method of claim 1, further comprising:
comparing a repetition level of a coverage enhancement policy employed for communicating between the communication device and the base station of the source cell and the regulated repetition levels of the plurality of candidate cells,
wherein the target cell is selected based on said comparing of the repetition level.

10. The method of claim 1, further comprising:
based on a signal quality of a wireless link between the UE and the base station of the target cell and further based on the regulated repetition level of the target cell:
determining a repetition level of a coverage enhancement policy employed for said communicating between the communication device and the base station of the target cell.

11. The method of claim 1, further comprising:
comparing a signal quality of a wireless link between the source cell and the communication device and a signal quality of further wireless links between base stations of the plurality of candidate cells and the communication device,
wherein the target cell is selected based on said comparing of the signal qualities.

12. The method of claim 1, further comprising:
receiving, from the base station of the target cell, a further downlink control message which is indicative of a plurality of regulated repetition levels of the target cell, and optionally based on the plurality of regulated repetition levels of the target cell:
determining a repetition level of a coverage enhancement policy associated with said communicating between the communication device and the base station of the target cell.

13. The method of claim 1,
wherein the plurality of candidate cells are at least one of spatially nearest neighbors of the source cell and included in the same tracking area of the network as the source cell.

14. The method of claim 1, wherein said communicating between the communication device and the base station of the target cell comprises:
receiving at least one repetition of a paging message from the base station of the target cell.

15. A method, comprising:
transmitting at least one downlink control message from a base station of a source cell of a network to a communication device, the at least one downlink control message being indicative of access restrictions of a plurality of candidate cells of the network, and
wherein the at least one downlink control message is indicative, for the plurality of candidate cells of the network, of at least one respective regulated repetition level.

16. The method of claim 15, further comprising:
selecting the plurality of candidate cells of the network from a plurality of cells of the network based on at least one of a spatial arrangement of the source cell with respect to the cells of the plurality of cells and a tracking area of the source cell.

17. A base station comprising control circuitry configured to perform:
transmitting at least one downlink control message from a base station of a source cell of a network to a communication device, the at least one downlink control message being indicative of access restrictions of a plurality of candidate cells of the network, and
wherein the at least one downlink control message is indicative, for the plurality of candidate cells of the network, of at least one respective regulated repetition level.

18. A method of operating a communication device, comprising:
receiving at least one downlink control message from a base station of a source cell of a network, the at least one downlink control message being indicative of access restrictions of a plurality of candidate cells of the network,
based on the at least one downlink control message:
selecting a target cell from the plurality of candidate cells, and
camping on the target cell, and
wherein the at least one downlink control message is indicative, for the plurality of candidate cells of the network, of at least one respective regulated repetition level.

* * * * *